US007768979B2

(12) United States Patent
Sutivong et al.

(10) Patent No.: US 7,768,979 B2
(45) Date of Patent: Aug. 3, 2010

(54) SEPARATING PILOT SIGNATURES IN A FREQUENCY HOPPING OFDM SYSTEM BY SELECTING PILOT SYMBOLS AT LEAST HOP AWAY FROM AN EDGE OF A HOP REGION

(75) Inventors: Arak Sutivong, Bangkok (TH); Ayman Fawzy Naguib, Cupertino, CA (US); Dhananjay Gore, San Diego, CA (US); Alexei Gorokhov, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 663 days.

(21) Appl. No.: 11/132,765

(22) Filed: May 18, 2005

(65) Prior Publication Data

US 2006/0291371 A1 Dec. 28, 2006

(51) Int. Cl.
*H04W 4/00* (2009.01)
(52) U.S. Cl. .................. 370/334; 375/132; 455/450
(58) Field of Classification Search ............ 455/442, 455/443, 450; 375/132–137; 370/329–334
See application file for complete search history.

(56) References Cited

U.S. PATENT DOCUMENTS

| | | | | |
|---|---|---|---|---|
| 5,781,536 A * | 7/1998 | Ahmadi et al. | ............... | 370/252 |
| 5,867,478 A * | 2/1999 | Baum et al. | .................. | 370/203 |
| 6,038,450 A * | 3/2000 | Brink et al. | ................... | 455/442 |
| 6,061,337 A * | 5/2000 | Light et al. | .................. | 370/331 |
| 6,275,186 B1 * | 8/2001 | Kong | ......................... | 342/363 |
| 6,337,983 B1 * | 1/2002 | Bonta et al. | ................... | 455/437 |
| 6,388,998 B1 * | 5/2002 | Kasturia | ...................... | 370/320 |
| 6,751,444 B1 * | 6/2004 | Meiyappan | ................... | 455/69 |
| 6,907,246 B2 * | 6/2005 | Xu et al. | ...................... | 455/447 |
| 7,069,009 B2 * | 6/2006 | Li et al. | ....................... | 455/446 |
| 2003/0087640 A1 * | 5/2003 | Rotstein et al. | ............. | 455/446 |
| 2005/0048979 A1 * | 3/2005 | Chun et al. | .................. | 455/443 |
| 2006/0203707 A1 * | 9/2006 | Lee et al. | ..................... | 370/208 |

FOREIGN PATENT DOCUMENTS

| | | |
|---|---|---|
| TW | 285794 | 9/1996 |
| TW | 407406 | 10/2000 |
| TW | 223963 | 11/2004 |

OTHER PUBLICATIONS

International Search Report—PCT/US06/019434—International Search Authority, US—May 21, 2008.
Written Opinion—PCT/US06/019434—International Search Authority, US—May 21, 2008.
International Preliminary Report on Patentability—PCT/US06/019434—International Bureau of WIPO, Geneva, Switzerland—Jun. 18, 2008.

\* cited by examiner

*Primary Examiner*—Nick Corsaro
*Assistant Examiner*—Vladimir Magloire
(74) *Attorney, Agent, or Firm*—Dmitry R. Milikovsky; Darren M. Simon

(57) ABSTRACT

Transmission patterns for pilot symbols transmitted from a mobile station or base station are provided. The patterns may be selected according to a location of the mobile station with respect to one or more antennas are provided. In some aspects, the pattern may be selected based upon the distance between the mobile station and the one or more antennas. In other aspect, the pattern may be based upon whether the mobile station is in handoff.

47 Claims, 14 Drawing Sheets

SEPARATING PILOT SIGNATURES IN A FREQUENCY HOPPING OFDM SYSTEM BY SELECTING PILOT SYMBOLS AT LEAST HOP AWAY FROM AN EDGE OF A HOP REGION

BACKGROUND

I. Field

The present document relates generally to wireless communication and amongst other things to handoff in a wireless communication system.

II. Background

An orthogonal frequency division multiple access (OFDMA) system utilizes orthogonal frequency division multiplexing (OFDM). OFDM is a multi-carrier modulation technique that partitions the overall system bandwidth into multiple (N) orthogonal frequency subcarriers. These subcarriers may also be called tones, bins, and frequency channels. Each subcarrier is associated with a respective sub carrier that may be modulated with data. Up to N modulation symbols may be sent on the N total subcarriers in each OFDM symbol period. These modulation symbols are converted to the time-domain with an N-point inverse fast Fourier transform (IFFT) to generate a transformed symbol that contains N time-domain chips or samples.

In a frequency hopping communication system, data is transmitted on different frequency subcarriers in different time intervals, which may be referred to as "hop periods". These frequency subcarriers may be provided by orthogonal frequency division multiplexing, other multi-carrier modulation techniques, or some other constructs. With frequency hopping, the data transmission hops from subcarrier to subcarrier in a pseudo-random manner. This hopping provides frequency diversity and allows the data transmission to better withstand deleterious path effects such as narrow-band interference, jamming, fading, and so on.

An OFDMA system can support multiple mobile stations simultaneously. For a frequency hopping OFDMA system, a data transmission for a given mobile station may be sent on a "traffic" channel that is associated with a specific frequency hopping (FH) sequence. This FH sequence indicates the specific subcarrier to use for the data transmission in each hop period. Multiple data transmissions for multiple mobile stations may be sent simultaneously on multiple traffic channels that are associated with different FH sequences. These FH sequences may be defined to be orthogonal to one another so that only one traffic channel, and thus only one data transmission, uses each subcarrier in each hop period. By using orthogonal FH sequences, the multiple data transmissions generally do not interfere with one another while enjoying the benefits of frequency diversity.

An accurate estimate of a wireless channel between a transmitter and a receiver is normally needed in order to recover data sent via the wireless channel. Channel estimation is typically performed by sending a pilot from the transmitter and measuring the pilot at the receiver. The pilot signal is made up of pilot symbols that are known a priori by both the transmitter and receiver. The receiver can thus estimate the channel response based on the received symbols and the known symbols.

A code division multiple access (CDMA) system has a universal frequency reuse that makes it possible for mobile users to receive and send the same signal simultaneously from and to multiple base stations or sectors of a base station. Soft and softer handoff in CDMA systems are techniques whereby mobiles near cell, and sector in the case of softer handoff, boundaries communicate the same transmitted signals to more than one base station or sector of a base station. Soft and softer handoff provides enhanced communication quality and a smoother transition compared to the conventional hard handoff. Soft and softer handoff is intrinsic to a CDMA system, as transmitted signals of different users occupy the same time and frequency allocation. Different users can be separated based on the respective spreading signatures.

Supporting soft and softer handoff in orthogonal multiple-access systems such as TDMA, FDMA and OFDMA is far more difficult and often requires special planning. Consider a reverse link transmission in FH-OFDMA. Each user is assigned a non-overlapping time and frequency resource. As such there is little or no intra-cell. However, it is often not possible to reliably detect the signal in a nearby sector or cell, as the interference is considerably large compared to the signal. Low signal-to-noise ratio causes the channel estimation to be inaccurate, further degrading the overall detection performance. Often, the post-detection signal-to-noise ratio (SNR) is too low for the signal observed in a nearby cell/sector to be useful. Techniques such as active set based restricted frequency (ASBR) hopping and common hopping sequence can be used to help improve the detection reliability of the signal observed in a nearby sector/cell. These techniques, however, result in smaller usable system resources (e.g., bandwidth) and often require significant planning.

Therefore, there is a need to find efficient approaches to provide soft and softer handoff in OFDMA systems while minimizing the amount of overhead required to perform the soft and softer handoff.

SUMMARY

A wireless communication apparatus defines one aspect of the innovation. The apparatus includes multiple antenna groups each of which corresponds to a different area of a plurality of areas. The apparatus also includes a memory that stores a plurality of indicators each corresponding to a group of pilot symbols of a plurality of groups of pilot symbols. Additionally, the apparatus includes a circuit coupled with the multiple antenna groups that selects an indicator from the plurality of indicators, to be transmitted to a wireless communication device within the area, to assign the wireless device to transmit a group of pilot symbols to the wireless communication device.

A further aspect is provided for by another wireless communication apparatus. The apparatus includes multiple antenna groups and a memory that stores a plurality of pilot patterns indicators each corresponding to a plurality of pilot symbols. The apparatus also includes a circuit coupled with the multiple antenna groups that selects a pilot pattern indicator from the plurality of pilot pattern indicators to be transmitted to a wireless communication device based upon whether the wireless communication device is in handoff.

Another aspect is defined by a method for selecting a pilot patter for a wireless communication device. The method includes determining a location of a wireless communication device with respect to an antenna and selecting a pilot pattern from a plurality of pilot patterns to be utilized for transmission by the wireless communication device based upon the location. The method also includes transmitting an indicator of the pilot pattern to the wireless communication device.

A related aspect is defined by wireless communication apparatus that includes means for determining a location of a wireless communication device with respect to an antenna of the wireless communication apparatus and means for selecting a pilot pattern of a plurality of pilot patterns to be utilized for transmission by the wireless communication device based upon the location. The apparatus also includes a transmitter configured to transmit signals including the indicator of the pilot pattern.

Another method of selecting a pilot pattern for a wireless communication device defines a further aspect. The method includes determining whether a wireless communication device is in handoff and selecting a pilot pattern from a plurality of pilot patterns to be utilized for transmission by the wireless communication device based upon whether the wireless communication device is in handoff. The method further includes transmitting an indicator of the pilot pattern to the wireless communication device.

Yet another aspect is provided for by another wireless communication apparatus. The apparatus includes multiple antenna groups and a memory that stores a plurality of indicators each corresponding to a pilot pattern of a plurality of pilot patterns. The apparatus also included a circuit coupled with the multiple antenna groups that selects an indicator of the plurality of indicators, to be transmitted to a wireless communication device in communication with one of the plurality of antenna groups based upon which antenna group is in communication with the wireless communication device.

Another wireless communication apparatus defines a further aspect of the innovation. The apparatus includes multiple antenna groups each of which corresponds to a different area of a plurality of areas in which a wireless communication apparatus is capable of communication. The apparatus also includes a memory that stores a plurality of indicators each corresponding to a pilot pattern of a plurality of pilot patterns, at least one of the plurality of pilot patterns corresponding to a handoff. Additionally, the apparatus includes a circuit coupled with the multiple antenna groups and the memory. The circuit operable to determine if a pilot pattern received at one or more of the antenna groups corresponds to the at least one pilot pattern and combine processed data symbols, associated with the at least one pilot pattern, received at the one or more antenna groups.

Various aspects and embodiments of the invention are described in further detail below. The invention further provides methods, processors, transmitter units, receiver units, base stations, terminals, systems, and other apparatuses and elements that implement various aspects, embodiments, and features of the invention, as described in further detail below.

BRIEF DESCRIPTION OF THE DRAWINGS

The features, nature, and advantages of the present embodiments may become more apparent from the detailed description set forth below when taken in conjunction with the drawings in which like reference characters identify correspondingly throughout and wherein.

DETAILED DESCRIPTION

Figure 1:
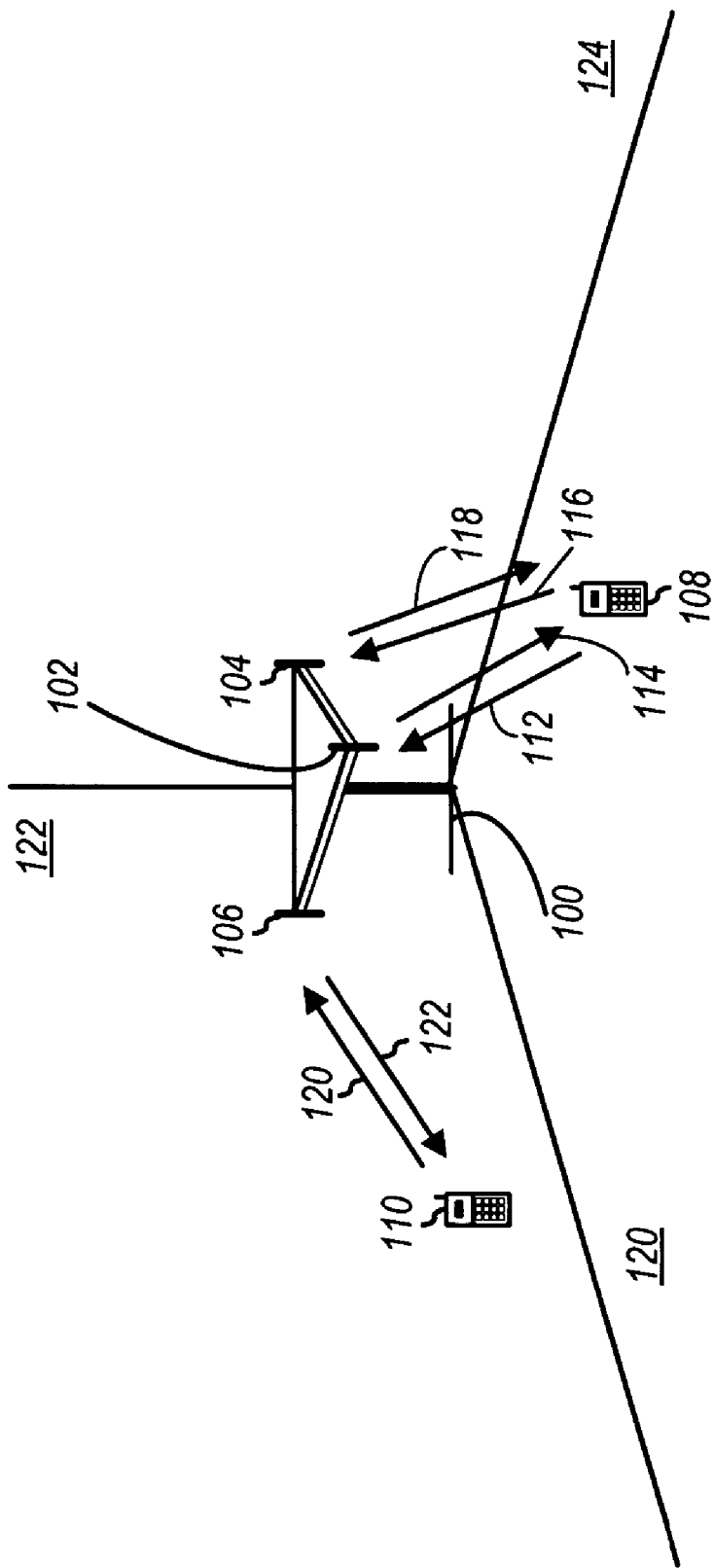
FIG. 1 illustrates a multiple access wireless communication system according to one embodiment.

Referring to FIG. 1, a multiple access wireless communication system according to one embodiment is illustrated. A base station 100 includes multiple antenna groups 102, 104, and 106 each including one or more antennas. In FIG. 1, only one antenna is shown for each antenna group 102, 104, and 106, however, one or multiple antennas may be utilized for each antenna group that corresponds to a sector of base station 100. Mobile station 108 is in communication with antenna 102, where antenna 102 transmits information to mobile station 108 over forward link 114 and receives information from mobile station 108 over reverse link 112. Mobile station 110 is in communication with antenna 106, where antenna 106 transmits information to mobile station 110 over forward link 122 and receives information from mobile station 110 over reverse link 120.

Each group of antennas 102, 104, and 106 and/or the area in which they are designed to communicate is often referred to as a sector of the base station. In the embodiment, antenna groups 102, 104, and 106 each are designed to communicate to mobile stations in a sector, sectors 120, 122, and 124, respectively, of the areas covered by base station 100.

In order to facilitate handoff for a mobile station, e.g. mobile station 108, a specific pilot pattern is provided to those mobile stations in handoff. The specific arrangement of pilot symbols may be such that all of the mobile stations near the edge of a sector boundary are assigned to transmit a known pattern of pilot symbols so that two different sectors may simultaneously decode the pilot symbols. For example, in FIG. 1, mobile station 110 may reside at the sector boundary between sector 124 and 120 and be in communication with antenna 104, where antenna 104 transmits information to mobile station 110 over forward link 118 and receives information from mobile station 110 over reverse link 116. In other embodiments, a specific pilot pattern is assigned to those mobile stations for which handoff has been requested. The pilot pattern assigned to the mobile station may vary depending on the sectors between which the handoff is occurring, the cell or sector with which the mobile station is communicating.

In order to allow for efficient processing of data symbols, base station 100 may combine data symbols, from multiple sectors for a same mobile station. In an embodiment, this may be done by utilizing the pilot pattern of the mobile station to spatially separate the mobile stations in handoff. That is, since a pilot pattern is known for each mobile station a channel estimate and channel matrix may be obtained for each mobile station from symbols received at the antennas of each sector. This estimate may then be utilized to generate data symbols by combining the data symbols received in each sector. However, it should be noted that in other embodiments combining of data symbols is not performed and the data symbols received in each sector may be decoded independently.

A base station may be a fixed station used for communicating with the terminals and may also be referred to as, and include some or all the functionality of, an access point, a Node B, or some other terminology. A mobile station may also be referred to as, and include some or all the functionality of, a mobile station, a user equipment (UE), a wireless communication device, terminal, access terminal or some other terminology.

As used herein, in communication with antenna group or antenna generally refers to the antennas group or antenna that is responsible for transmission to a mobile station. In the case of transmission from a mobile station, multiple antenna groups may be utilized to receive transmissions including utilizing soft or other types of combining.

Figure 2:
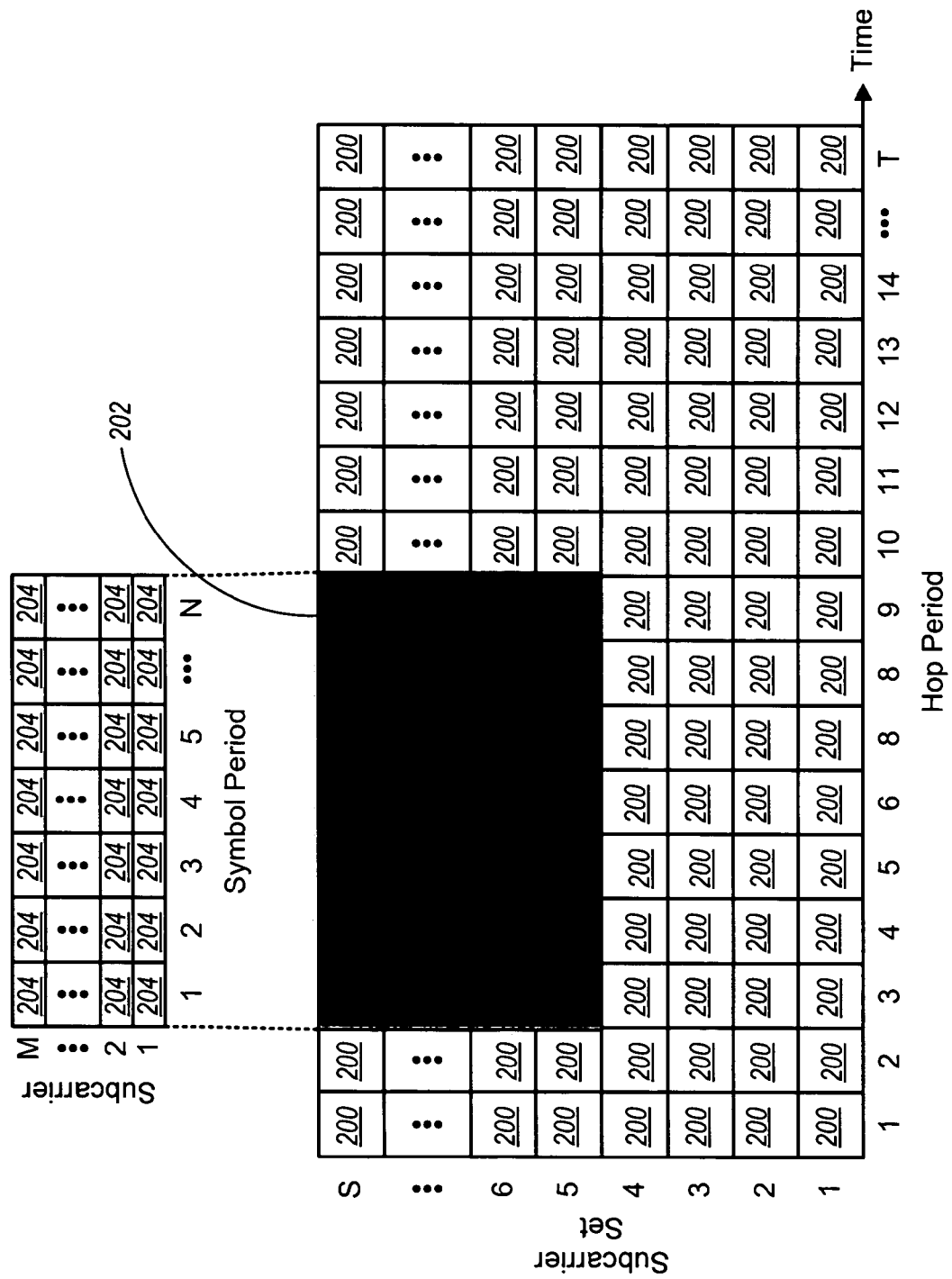
FIG. 2 illustrates a spectrum allocation scheme for a multiple access wireless communication system according to one embodiment.

Referring to FIG. 2, a spectrum allocation scheme for a multiple access wireless communication system is illustrated. A plurality of OFDM symbols 200 is allocated over T symbol periods and S frequency subcarriers. Each OFDM symbol 200 comprises one symbol period of the T symbol periods and a tone or frequency subcarrier of the S subcarriers.

In an OFDM frequency hopping system, one or more symbols 200 may be assigned to a given mobile station. In one embodiment of an allocation scheme as shown in FIG. 2, one or more hop regions, e.g. hop region 202, of symbols to a group of mobile stations for communication over a reverse link. Within each hop region, assignment of symbols may be randomized to reduce potential interference and provide frequency diversity against deleterious path effects.

Each hop region 202 includes symbols 204 that are assigned to the one or more mobile stations that are in communication with the sector of the base station and assigned to the hop region. During each hop period, or frame, the location of hop region 202 within the T symbol periods and S subcarriers varies according to a hopping sequence. In addition, the assignment of symbols 204 for the individual mobile stations within hop region 202 may vary for each hop period.

The hop sequence may pseudo-randomly, randomly, or according to a predetermined sequence, select the location of the hop region 202 for each hop period. The hop sequences for different sectors of the same base station are designed to be orthogonal to one another to avoid "intra-cell" interference among the mobile station communicating with the same base station. Further, hop sequences for each base station may be pseudo-random with respect to the hop sequences for nearby base stations. This may help randomize "inter-cell" interference among the mobile stations in communication with different base stations.

In the case of a reverse link communication, some of the symbols 204 of a hop region 202 are assigned to pilot symbols that are transmitted from the mobile stations to the base station. The assignment of pilot symbols to the symbols 204 should preferably support space division multiple access (SDMA), where signals of different mobile stations overlapping on the same hop region can be separated due to multiple receive antennas at a sector or base station, provided enough difference of spatial signatures corresponding to different mobile stations. To more accurately extract and demodulate signals of different mobile stations, the respective reverse link channels should be accurately estimated. Therefore, it may be desired that pilot symbols on the reverse link enable separating pilot signatures of different mobile stations at each receive antenna within the sector in order to subsequently apply multi-antenna processing to the pilot symbols received from different mobile stations.

Block hopping may be utilized for both the forward link and the reverse link, or just for the reverse link depending on the system. It should be noted that while FIG. 2 depicts hop region 200 having a length of seven symbol periods, the length of hop region 200 can be any desired amount, may vary in size between hop periods, or between different hopping regions in a given hop period.

It should be noted that while the embodiment of FIG. 2 is described with respect to utilizing block hopping, the location of the block need not be altered between consecutive hop periods or at all.

Figure 3A:
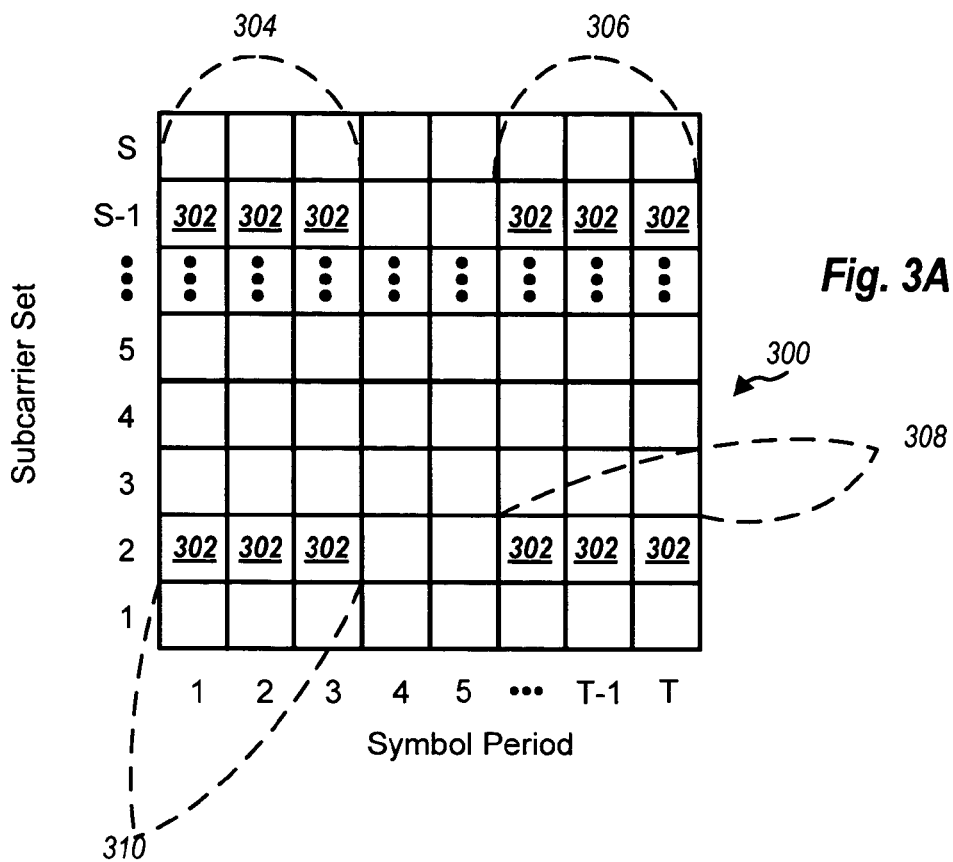
FIG. 3A illustrates a block diagrams of a pilot assignment scheme according to one embodiment.
Figure 3B:
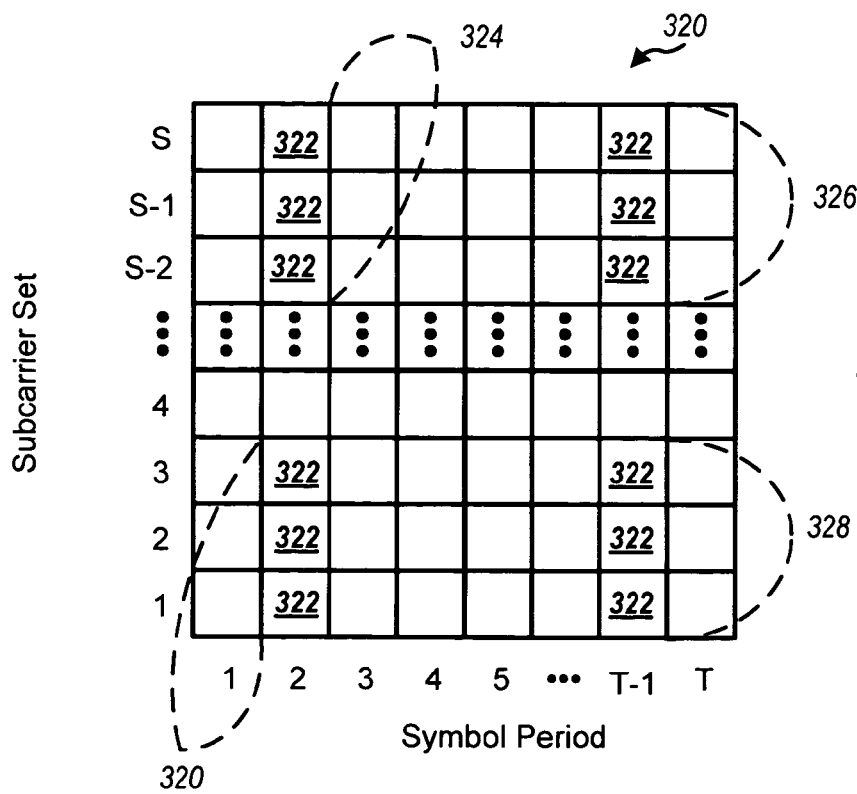
FIG. 3B illustrates a block diagrams of a pilot assignment scheme according to another embodiment.

Referring to FIGS. 3A and 3B, block diagrams of pilot assignment schemes according to several embodiments are illustrated. Hop regions 300 and 320 are defined by N symbol periods by S subcarriers or tones. Hop region 300 includes pilot symbols 302 and hop region 320 includes pilot symbols 322, with the remaining symbols periods and tone combinations available for data symbols and other symbols. In one embodiment, pilot symbol locations for each hop regions, i.e. a group of $N_S$ contiguous tones over $N_T$ consecutive OFDM symbols, should have pilot tones located close to the edges of the hop region. This is generally because typical channels in wireless applications are relatively slow functions of time and frequency so that a first order approximation of the channel, e.g. a first order Taylor expansion, across the hop region in time and frequency provides information regarding channel conditions that is sufficient to estimate the channel for a given mobile station. As such, it is preferred to estimate a pair of channel parameters for proper receipt and demodulation of symbols from the mobile stations, namely the constant component of the channel, a zero order term of a Taylor expansion, and the linear component, a first order term Taylor expansion, of the channel across the time and frequency span of the channel. Generally estimation accuracy of the constant component is independent of pilot placement. The estimation accuracy of the linear component is generally preferably achieved with pilot tones located at the edges of the hop region.

Pilot symbols 302 and 322 are arranged in contiguous pilot symbol clusters 304, 306, 308, and 310 (FIG. 3A) and 324, 326, 328, and 330 (FIG. 3B). In one embodiment, each cluster 304, 306, 308, and 310 (FIG. 3A) and 324, 326, 328, and 330 (FIG. 3B) within a hop region, has a fixed number, and often the same number, of pilot symbols within a given hop region. The utilization of clusters 304, 306, 308, and 310 (FIG. 3A) and 324, 326, 328, and 330 (FIG. 3B) of contiguous pilot symbols may, in one embodiment take into account the effect of a multi-user interference caused by inter-carrier interference which results from high Doppler and/or symbol delay spreads. Further, if pilot symbols from mobile stations scheduled on a same hop region are received at substantially different power levels, signals of a stronger mobile station may create a significant amount of interference for a weaker mobile station. The amount of interference is higher at the edges, e.g. subcarrier 1 and subcarrier S, of the hop region and also at the edge OFDM symbols, e.g. symbol periods 1 and T, when the leakage is caused by excess delay spread, i.e. when the portion of channel energy concentrated in the taps that exceed cyclic prefix of the OFDM symbols becomes significant. Therefore, if pilot symbols are located exclusively at the edges of a hop region there may be degradation in channel estimation accuracy and a bias in interference estimation. Hence, as depicted in FIGS. 3A and 3B pilot symbols are placed close to the edges of the hop region, however, avoiding the situation where all the pilot symbols are at the edges of the hop region.

Referring to FIG. 3A, a hop region 300 is comprised of pilot symbols 302. In the case of channels with a pronounced frequency selectivity rather than time selectivity, pilot symbols 302 are located in contiguous pilot symbol clusters 304, 306, 308, and 310 with each pilot symbol cluster 304, 306, 308, and 310 spanning a multiple symbol periods and one frequency tone. The frequency tone is preferably chosen to be close to the edges of the frequency range of the hop region 300, however, not exactly at the edge. In the embodiment of FIG. 3A, none of the pilot symbols 302 in a given cluster are at the edge frequency tones and in each cluster only pilot symbol may be at an edge symbol period.

One rationale behind a "horizontal" shape of the contiguous pilot symbol clusters of pilot symbols 302 is that, for channels with higher frequency selectivity, the first order (linear) component may be stronger in the frequency domain than in the time domain.

It should be noted that one or more pilot symbols in each cluster, in the embodiment of FIG. 3A, may be at a different tone than one or more pilot symbols in a different cluster. For example, cluster 304 may be at tone S and cluster 306 may be at tone S-1.

Referring to FIG. 3B, in the case of channels with a pronounced time selectivity rather than frequency selectivity, pilot symbols 322 are arranged in clusters 324, 326, 328, and 330 of contiguous pilot symbols that each span multiple frequency tones but have a same symbol period of hop region 320. OFDM symbols at the edges of hop region 320, those that have a maximum tone, e.g. tone S, or minimum tone, e.g. tone 1, of the frequency range that defines the S subcarriers, may be included as part of the pilot symbols, since there may be pilot symbols 322 that are at the edges of the hop region 320. However, in the embodiment shown in FIG. 3B, only one pilot symbol in each cluster may be assigned to the maximum or minimum frequency subcarrier.

In the embodiment depicted in FIG. 3B, a channel with higher time selectivity may have a typical pattern that may be obtained by a 90° rotation of the pattern chosen for channels with higher frequency selectivity (FIG. 3A).

It should be noted that one or more pilot symbols in each cluster, in the embodiment of FIG. 3B, may be assigned to a different symbol period than one or more pilot symbols in a different cluster. For example, cluster 324 may be at different symbol period T than cluster 326.

Additionally, as depicted in the embodiments of FIGS. 3A and 3B, pilot patterns are provided so that the clusters, 304, 306, 308, and 310 (FIG. 3A) and 324, 326, 328, and 330 (FIG. 3B), are preferably symmetric with respect to the center of the hop region. The symmetry of the clusters with respect to the center of the hop region may provide improved simultaneous estimation of the channel with respect to time and frequency responses of the channel.

It should be noted that while FIGS. 3A and 3B depict four clusters of pilot symbols per hop region, a fewer or greater amount of clusters may be utilized in each hop region. Further, the number of pilot symbols per pilot symbol cluster may also vary. The total number of pilot symbols and pilot symbol clusters are a function of the number of pilot symbols required by the base station to successfully demodulate data symbols received on the reverse link and to estimate the channel between the base station and the mobile station. Also, each cluster need not have the same number of pilot symbols. The number of mobile stations that can be multiplexed over a single hop region can, in one embodiment, be equal to the number of pilot symbols in a hop region.

In addition, while FIGS. 3A and 3B depict pilot symbol clusters designed either for channels having frequency selectivity or time selectivity the pilot pattern may be such that there are clusters for frequency selective channels as well as clusters for time selective channels in the same pilot pattern, e.g. some clusters arranged in the pattern of clusters 304, 306, 308, or 310 and some clusters arranged in the pattern of clusters 324, 326, 328, or 330.

In some embodiments, pre-determined pilot patterns for those mobile stations in handoff or at the boundary between two or more sectors or cells will have a pilot pattern that indicates the condition. These pre-determined pilot patterns may be based upon different locations of the pilot symbols versus locations of pilot symbols for pilot patterns used for mobile stations in non-handoff communication with an antenna group of a sector of a base station.

Figure 4A:
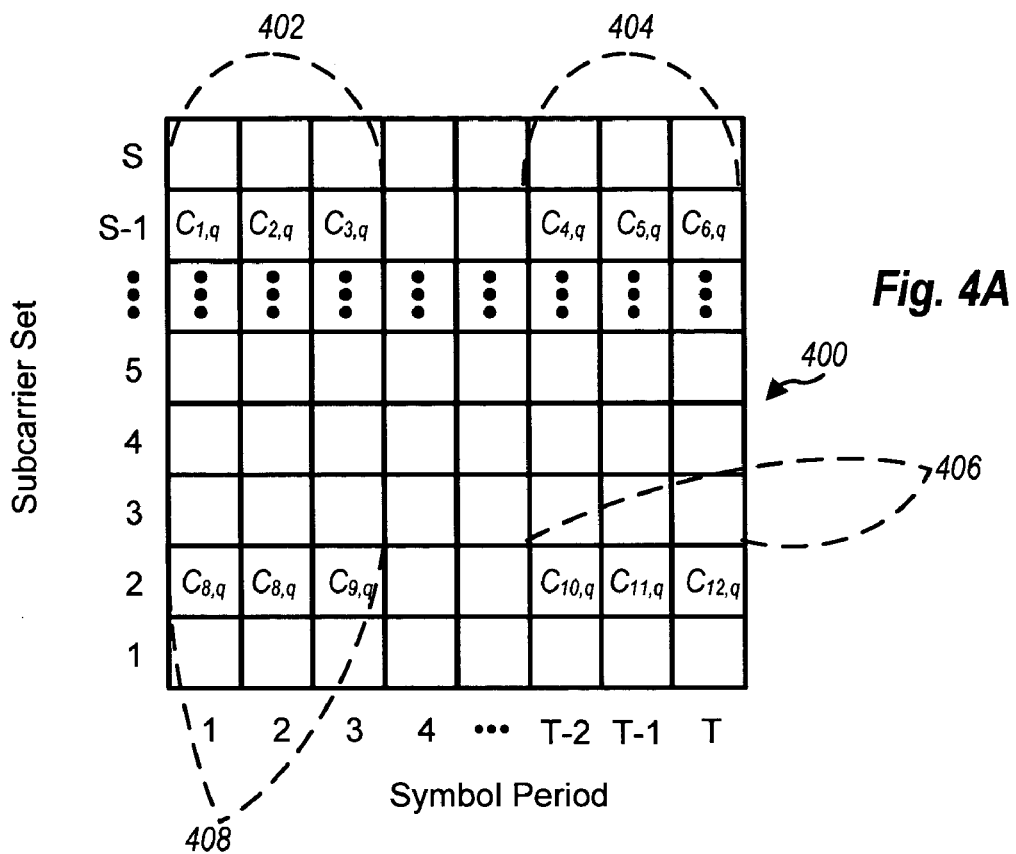
FIG. 4A illustrates a pilot symbol scrambling scheme according to one embodiment.
Figure 4B:
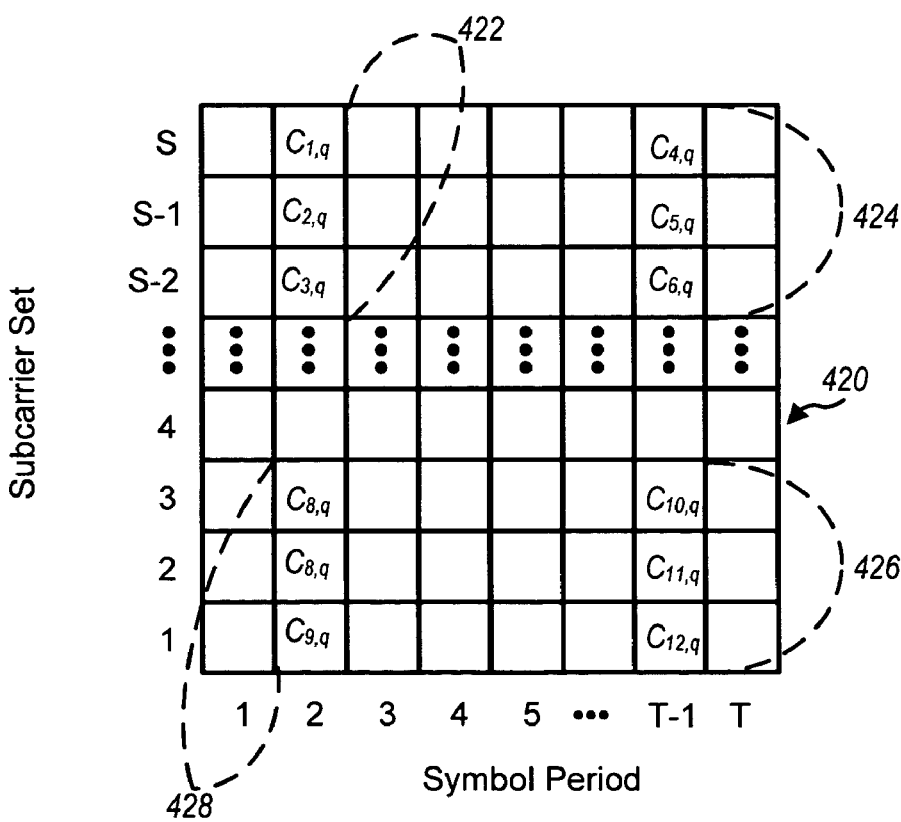
FIG. 4B illustrates a pilot symbol scrambling scheme according to another embodiment.

Referring to FIGS. 4A and 4B, pilot allocation schemes according to further embodiments are illustrated. In FIG. 4A, hop regions 400 includes pilot symbols $C_{1,q}$, $C_{2,q}$, and $C_{3,q}$, arranged in cluster 402; $C_{4,q}$, $C_{5,q}$, and $C_{6,q}$, arranged in cluster 404; $C_{7,q}$, $C_{8,q}$, and $C_{9,q}$, arranged in cluster 406; and $C_{10,q}$, $C_{11,q}$, and $C_{12,q}$ arranged in cluster 408. In one embodiment, in order to improve spatial diversity in hop regions where multiple mobile stations provide overlapping pilot symbols, the pilot symbols of different mobile stations should be multiplexed in such a way over the same OFDM symbol period and tone so that the pilot symbols are substantially orthogonal when received at the antennas of the cluster of the base station.

In FIG. 4A, each of the pilot symbols $C_{1,q}$, $C_{2,q}$, $C_{3,q}$, $C_{4,q}$, $C_{5,q}$, $C_{6,q}$, $C_{7,q}$, $C_{8,q}$, $C_{9,q}$, $C_{10,q}$, $C_{11,q}$, and $C_{12,q}$ are assigned to multiple mobile stations of hop region 400, that is each symbol period includes multiple pilot symbols, from a number of different mobile stations. Each of the pilot symbols in a pilot symbol cluster, e.g. cluster 402, 404, 406, and 408, are generated and transmitted in such a way that a receiver of the pilots symbols in the cluster, e.g. base station, can receive them so that they are orthogonal with respect to the pilot symbols from each other mobile station in the same cluster. This can be done by applying a predetermined phase shift, e.g. a scalar function to multiply, each of the samples constituting the pilot symbols transmitted by each of the mobile stations. To provide orthogonality, the inner products of vectors representing the sequence of the scalar functions in each cluster for each mobile station may be set to zero.

Further, in some embodiments, it is preferred that the pilot symbols of each cluster are orthogonal to the pilot symbols of each other cluster of the hop region. This can be provided in the same manner as orthogonality is provided for the pilot symbols within each cluster from a different mobile station, by utilizing a different sequence of scalar functions for the pilot symbols of each mobile station in each cluster of pilot symbols. Mathematical determination of orthogonality can be made by selecting a sequence of scalar multiples for each of the pilot symbols for a particular cluster for the particular mobile station the vector of which is orthogonal, e.g. the inner product is zero, with respect to a vector representing the sequence of scalar multiples used for the pilot symbols of the other mobile stations in all the clusters and the same mobile station in the other clusters.

In one embodiment the number of mobile stations that may be supported, where orthogonality of the pilot symbols across each of the clusters is provided, is equal to the number of pilot symbols that are provided per pilot symbol cluster.

In one embodiment, the exponential functions utilized to multiply the samples of the pilot symbols are generated utilizing a fast Fourier transform function.

In order to combat the intra-sector interference that may arise, scrambling codes may be used for the mobile stations. The scrambling code may be unique to individual mobile stations or may be the same for each of the mobile stations communicating with an individual sector.

In some embodiments, pre-determined scrambling sequences and/or codes may be assigned for pilot patterns for those mobile stations in handoff or at the boundary between two or more sectors or cells will have a pilot pattern that indicates the condition. These pre-determined sequences may be different than those for pilot symbols for pilot patterns used for mobile stations in non-handoff communication with an antenna group of a sector of a base station.

Figure 5A:
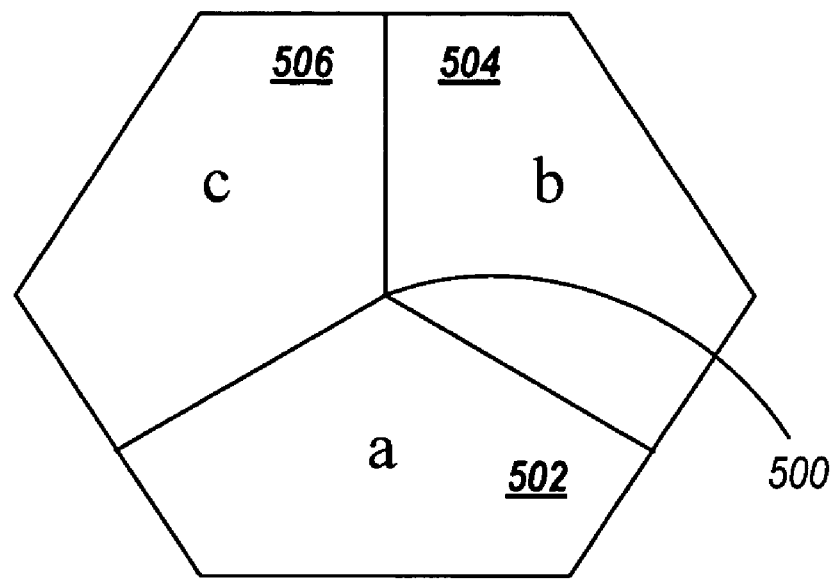
FIG. 5A illustrates a pilot pattern assignment scheme according to one embodiment.

Referring to FIG. 5A, a pilot pattern assignment scheme according to one embodiment is illustrated. A base station 500 includes three sectors 502, 504, and 506. Within each sector, a different pilot pattern is assigned to mobile users for reverse link transmission to the base station in each sector. In the embodiment of FIG. 5A, pilot pattern a is assigned to those mobile stations that communicate with antennas for sector 502, pilot pattern b is assigned to those mobile stations that communicate with antennas for sector 504, and pilot pattern c is assigned to those mobile stations that communicate with antennas for sector 506. The determination as to which sector is in communication with which mobile station may be readily made using well known techniques.

In order to facilitate handoff, base station 500 can determine if pilot symbols received in sector 502 are in pilot pattern a, b, or c. If the pilot symbols are in pilot pattern a, then the base station 500 knows that the mobile station is assigned to that sector. If the pilot symbols are in pilot pattern b or c then the base can either ignore them, if no handoff has been requested or assigned, or demodulate and decode the pilot symbols, if a handoff has been requested or assigned. The base station may then combine data symbols, received at antenna groups for each sector, for those mobile stations in handoff, to provide softer handoff. This combination may be performed as discussed with respect to FIGS. 9A-10.

In the embodiment of FIG. 5A, pilot patterns a, b, and c may be orthogonal to each to provide a relatively simple approach for base station 500 to decode pilot symbols, especially in cases where mobile stations in different sectors are assigned overlapping time and frequency allocations, e.g. the same hop region is assigned in different sectors to different mobile stations. Further, the associated data symbols of the pilot symbols may be simultaneously processed at multiple sectors of the base station, e.g. the data symbols transmitted by a mobile station in sector 502 may be decoded at each of the antennas for sectors 502, 504, and 506 and then combined using maximum ratio combining (MRC) or other known techniques. The simultaneous processing may be provided due to the orthogonality of the pilot patterns with respect to each other, thus allowing estimation and identification of data symbols for the mobile station based upon the orthogonality of the pilot patterns. The orthogonality may be in accordance to any of the approaches described with respect to FIGS. 3A, 3B, 4A, and 4B, e.g. pilot symbol locations, scrambling sequences unique to each user to multiply the pilot symbols transmitted by each user, or scrambling sequences unique to each sector multiply the pilot symbols transmitted by each user.

Figure 5B:
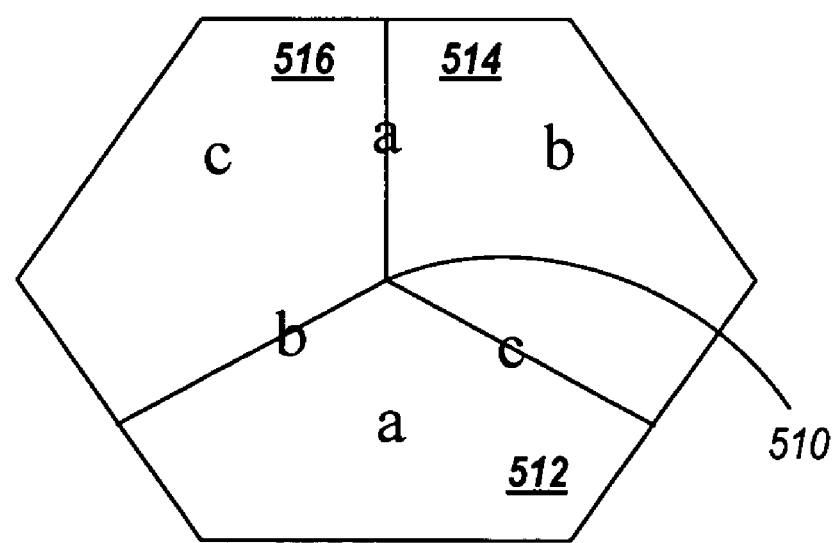
FIG. 5B illustrates a pilot pattern assignment scheme according to another embodiment.

Referring to FIG. 5B, a pilot pattern assignment scheme according to another embodiment is illustrated. A base station 510 includes three sectors 512, 514, and 516. Within each sector, a different pilot pattern is assigned to mobile users for reverse link transmission that are in non-handoff communication than those in non-handoff communication in another sector. In the embodiment of FIG. 5B, pilot pattern a is assigned to those mobile stations that communicate with antennas for sector 512, pilot pattern b is assigned to those mobile stations that communicate with antennas for sector 514, and pilot pattern c is assigned to those mobile stations that communicate with antennas for sector 516. The determination as to which sector is in communication with which mobile station may be readily made using well known techniques.

In addition, a specific pilot pattern is reserved for handoff, so that any sector that receives the specific pilot pattern knows that the mobile station is in softer handoff. In the embodiment, of FIG. 5B, those mobile stations that are assigned or request handoff between sectors 512 and 514 are assigned to transmit pilot symbols having pilot pattern c, those mobile stations that are assigned or request handoff between sectors 514 and 516 are assigned to transmit pilot symbols having pilot pattern a, and those mobile stations that are assigned or request handoff between sectors 516 and 512 are assigned to transmit pilot symbols having pilot pattern b. In this way, a sector is likely to have minimal interference for those mobile stations in softer handoff, since those sectors in handoff receive pilot symbols that will have low interference with those pilot symbols received at the same sector, since more distant sectors will be using the same pilot pattern. The base station may then combine pilot symbols and data symbols, for those mobile stations that transmit pilot symbols transmitted according to a pilot pattern reserved for handoff, received at antenna groups for each sector to provide softer handoff.

In the embodiment of FIG. 5B, pilot patterns a, b, and c may be orthogonal to each to provide a relatively simple approach for base station 510 to decode pilot symbols. The orthogonality may be in accordance to any of the approaches described with respect to FIGS. 3A, 3B, 4A, and 4B, e.g. pilot symbol locations, scrambling sequences unique to each user to multiply the pilot symbols transmitted by each user, or scrambling sequences unique to each sector multiply the pilot symbols transmitted by each user.

To decode the pilot symbols during handoff, the base station 510 may decide to separately extract the pilot symbols from each sector that uses one of the pilot patterns assigned for handoff, e.g. in sector 512 pilot symbols having pattern c are assumed to relate to a mobile station in handoff. This is possible because with respect to each sector, a handoff user is using a pilot sequence that is orthogonal to all other users in the sector. The base station may then combine data symbols, received at antenna groups for each sector, for those mobile stations in handoff, to provide softer handoff. This combination may be performed as discussed with respect to FIGS. 9A-10.

Alternatively, the base station may perform joint decoding using antennas from each of the sectors at the base station as described with respect to FIG. 5A and FIG. 5B for a pilot pattern assigned for handoff. In such embodiments, the base station may extract the data symbols of a user with the reserved pilot pattern for handoff from each sector and then combine it with signals having the same pilot pattern in the same hop region from other sectors. However, to provide orthogonality among handoff users at a same sector boundary, the hopping sequence of the user utilizing the pilot pattern reserved for handoff is the same in each of the two adjacent sectors. This is to provide that no two users, one from each of the adjacent sectors, are using the same pilot pattern over the same time-frequency, e.g. hop region, allocation at the same time.

Figure 5C:
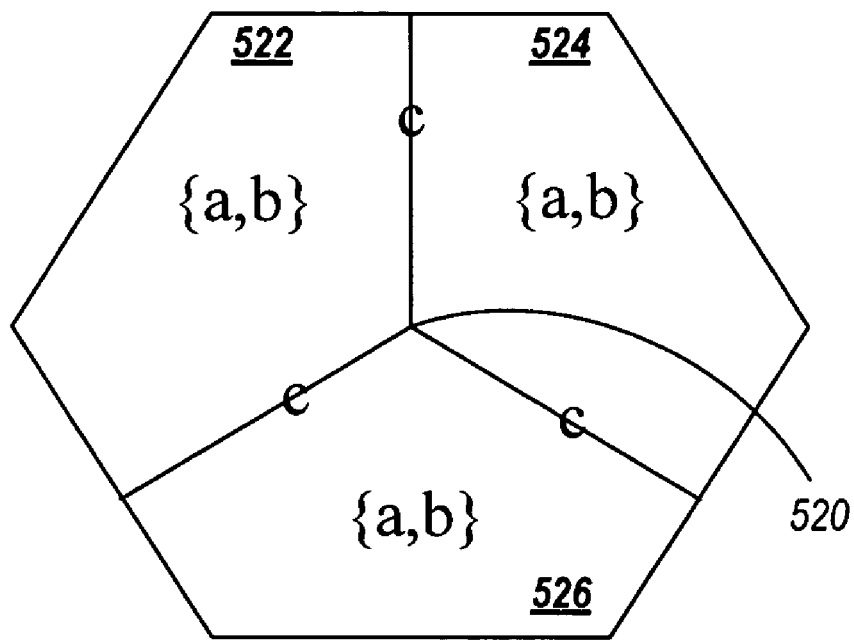
FIG. 5C illustrates a pilot pattern assignment scheme according to a further embodiment.

Referring to FIG. 5C, a pilot pattern assignment scheme according to a further embodiment is illustrated. A base station 520 includes three sectors 522, 524, and 516. Within each sector, a same pilot pattern or patterns is assigned to mobile users for reverse link transmission to the base station in each sector. In the embodiment of FIG. 5B, pilot patterns a and b are assigned to those mobile stations that communicate with antennas for sector 512, sector 514, and sector 516.

In addition, similarly to FIG. 5C, a specific pilot pattern is reserved for handoff, so that any sector that receives the specific pilot pattern knows that the mobile station is in handoff. In the embodiment of FIG. 5C, a same pilot pattern is assigned to each mobile station in handoff. However, different pilot patterns may be utilized depending on the sector from, or to, which the mobile station is in handoff. The base station may then combine data symbols, received at antenna groups for each sector, for those mobile stations in handoff, to provide softer handoff. This combination may be performed as discussed with respect to FIGS. 9A-10.

In the embodiment of FIG. 5C, pilot patterns a, b, and c may be orthogonal to each to provide a relatively simple approach for base station 520 to decode pilot symbols. The orthogonality may be in accordance to any of the approaches described with respect to FIGS. 3A, 3B, 4A, and 4B, e.g. pilot symbol locations, scrambling sequences unique to each user to multiply the pilot symbols transmitted by each user, or scrambling sequences unique to each sector multiply the pilot symbols transmitted by each user.

The data symbols related to the pilot pattern reserved for handoff, e.g. pilot pattern c, may be simultaneously processed at multiple sectors of base station 520, e.g. the pilot symbols transmitted by a mobile station in sector 502 may be decoded at each of the antennas for sectors 502, 504, and 506 and then combined by utilizing MRC or other known techniques. The simultaneous processing may be provided due to the utilization of the specific pilot pattern for handoff that is orthogonal with respect to all pilot patterns used within the sectors. The orthogonality may be in accordance to any of the approaches described with respect to FIGS. 3A, 3B, 4A, and 4B, e.g. pilot symbol locations, scrambling sequences unique to each user to multiply the pilot symbols transmitted by each user, or scrambling sequences unique to each sector multiply the pilot symbols transmitted by each user.

Referring to FIG. SD, a pilot pattern assignment scheme according to an additional embodiment is illustrated. A base station 530 includes three sectors 532, 534, and 536. Within each sector, a group of different pilot patterns is assigned to mobile users for reverse link transmission to the base station. In the embodiment of FIG. SD, one of pilot patterns a, b, and c is assigned to those mobile stations that communicate with antennas for sector 532, one of pilot patterns d, e, and f is assigned to those mobile stations that communicate with antennas for sector 534, and one of pilot patterns g, h, and i is assigned to those mobile stations that communicate with antennas for sector 536. The determination as to which sector is in communication with which mobile station may be readily made using well known techniques.

In order to facilitate handoff, base station 530 can determine if pilot symbols received in sector 532 are in pilot pattern a, b, or c. If the pilot symbols are in pilot pattern a, b, or c, then the base station 500 knows that the mobile station is assigned to that sector. If the pilot symbols are in pilot pattern d, e, f, g, h, or i then the base station can either ignore them, if no handoff has been requested or assigned to any mobile station, or demodulate and decode the pilot symbols, if a handoff has been requested or assigned to any mobile station in communication with the base station or a neighboring base station. The base station may then combine pilot symbols, and data symbols, received at antenna groups for each sector to provide softer handoff.

Figure 5D:
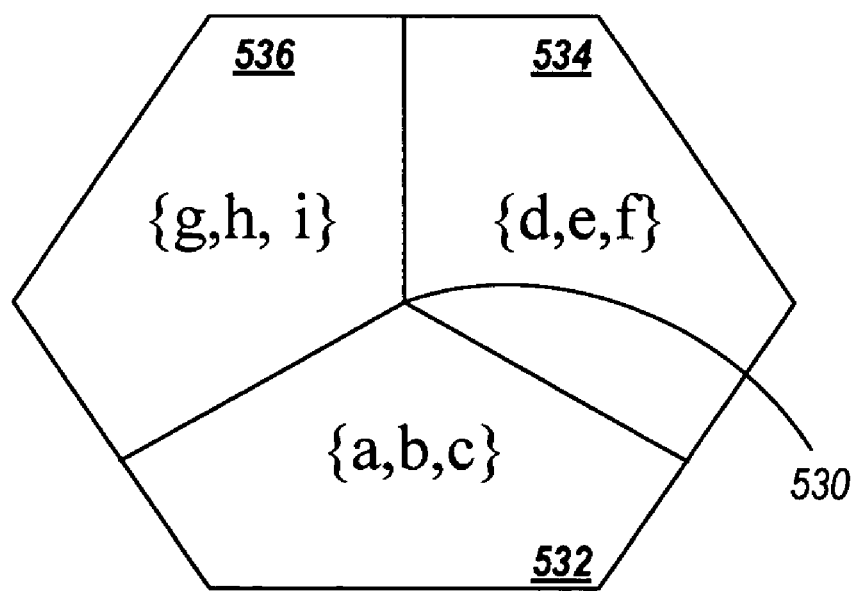
FIG. 5D illustrates a pilot pattern assignment scheme according to an additional embodiment.

In the embodiment of FIG. 5D, pilot patterns a, b, c, d, e, f, g, h, and i may be orthogonal to each to provide a relatively simple approach for base station 530 to decode pilot symbols, especially in cases where mobile stations in different sectors are assigned overlapping time and frequency allocations, e.g. the same hop region is assigned in different sectors to different mobile stations. Further, the data symbols associated with mobile stations in handoff may be simultaneously processed at multiple sectors of the base station, e.g. the pilot symbols transmitted by a mobile station in sector 532 may be decoded at each of the antennas for sectors 532, 534, and 536 and then combined by utilizing MRC or other known techniques. The simultaneous processing may be provided due to the orthogonality of the pilot patterns with respect to each other that allows users to be separated due to the orthogonality of the pilot patterns. The orthogonality may be in accordance to any of the approaches described with respect to FIGS. 3A, 3B, 4A, and 4B, e.g. pilot symbol locations, scrambling sequences unique to each user to multiply the pilot symbols transmitted by each user, or scrambling sequences unique to each sector multiply the pilot symbols transmitted by each user.

Figure 6:
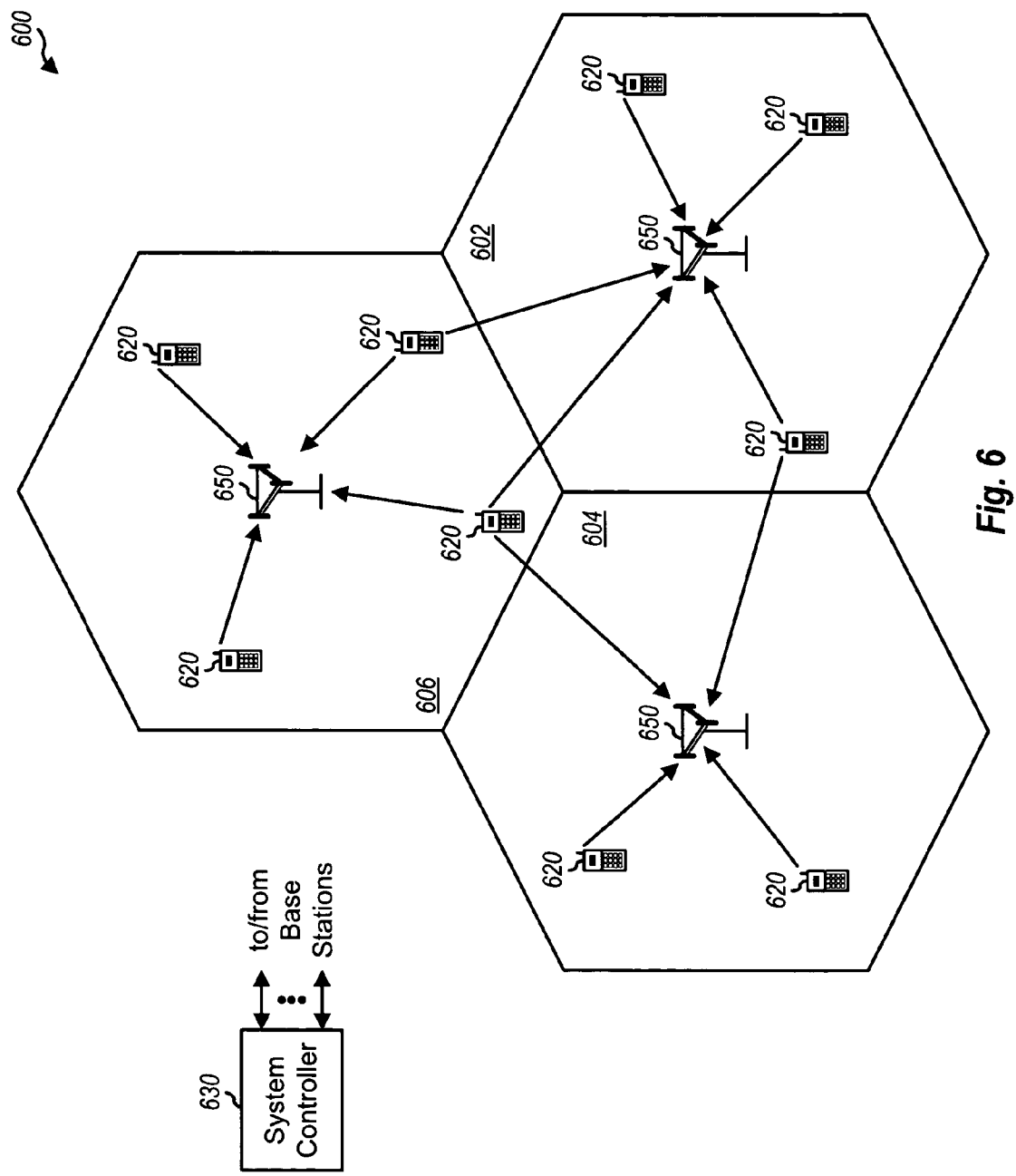
FIG. 6 illustrates a multiple access wireless communication system according to another embodiment.

Referring to FIG. 6, a multiple access wireless communication system according to another embodiment is illustrated. A multiple access wireless communication system 600 includes multiple cells, e.g. cells 602, 604, and 606. In the embodiment of FIG. 6, each cell 602, 604, and 606 may include multiple sectors, not shown, which are in communication with mobile stations 620. For handoffs between cells, there are several approaches which may be utilized. In one embodiment, each cell assigns a same pilot pattern to each mobile station in handoff. In this way, soft handoff may operate similar to softer handoff described with respect to FIG. 5C for softer handoff. In other embodiments, an approach similar to that of FIG. 5A or 5D may be utilized, where a specific pilot pattern or patterns may be assigned to different cells, either in every cell in the network or reused in specific patterns between groups of cells, based upon some geographic planning algorithmn. Both of these approaches provide the ability to decode pilot and data symbols from mobile stations communicating with one base station at multiple base stations. This is an efficient way to provide soft handoff without increasing processing overhead.

In order to process data symbols for those mobile stations in softer handoff, each base station may utilize the unique pilot symbols for those mobile stations in handoff to decode data symbols for those mobile stations in handoff. A base station controller 630 may then determine if one or more of the base stations has decoded transmission from those mobile stations in handoff. In an embodiment, if one or more base stations successfully decodes the data symbols then the decoded data symbols are combined from the base stations that successfully decoded the data symbols by the base station controller 630. In other embodiments, if one or more base stations successfully decodes the data symbols then the decoded data symbols from only one base station are utilized for transmission to the network.

Figure 7:
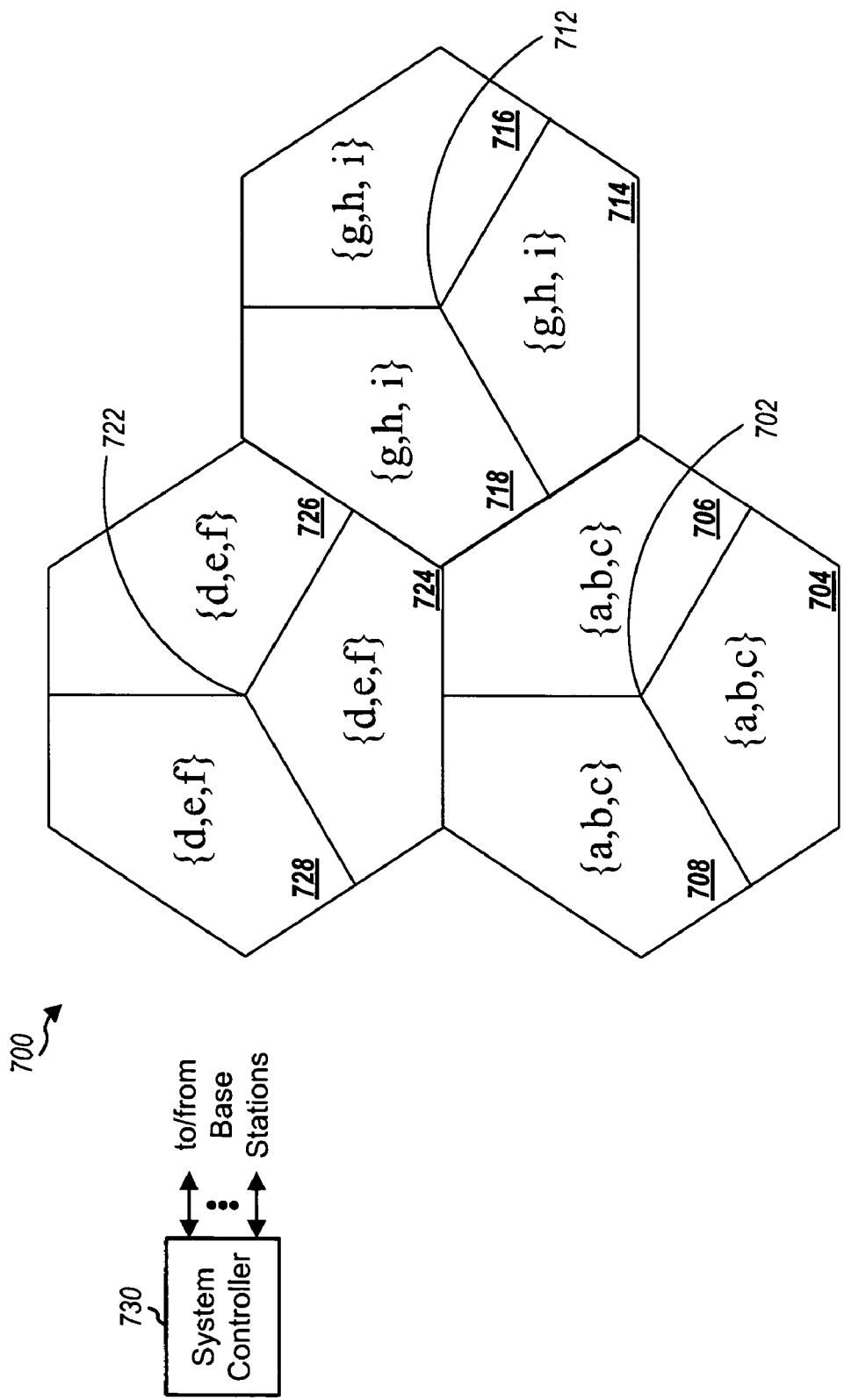
FIG. 7 illustrates a pilot pattern assignment scheme according to yet another embodiment.

Referring to FIG. 7, a pilot pattern assignment scheme according to yet another embodiment is illustrated. A plurality of base stations 702, 712, and 722 are controlled by a base station controller 730. Each of the base stations 702, 712, and 722 includes an antenna groups that correspond to a sector 704, 706, and 708, base station 702; sector 714, 716, and 718, base station 712; and sector 724, 726, and 728, base station 722. In order to facilitate soft handoff, in one embodiment, a different pilot pattern may be utilized at each base station with respect to an adjacent base station. For example, base station 702 utilizes pilot patterns a, b, and c for communication, base station 712 utilizes pilot patterns d, e, and f, and base station 722 utilizes pilot patterns g, h, and i In order to facilitate soft handoff, in one embodiment, base station controller 730 may decode data symbols related to pilot symbols that are in a pilot pattern of an adjacent sector. In other embodiments, this information may be available may be available at each base station and decoded symbols may be generated at each base station for pilot symbols from neighboring cells. The decoded symbols may be provided to base station controller 730 which then can combine them or only use for communication to the network.

In order to achieve orthogonality between the pilot patterns of each base station the pilot patterns a, b, and c; d, e, and f, and g, h, and i may each be orthogonal to each other. Alternatively, a cell specific scrambling sequence may be utilized, in addition to the user specific scrambling and sector specific scrambling. A cell specific scrambling schema may be defined by $Y_c = [Y_{1,c}, \ldots, Y_{N_p,c}^s]^T$ which is a vector of scalar functions that multiply the respective sequence of pilot symbols for every mobile station in the cell. The overall sequences of pilot symbols $Z_{(q,s,c)} = [Z_{1,(q,s,c)}, \ldots, Z_{N_p}^{(q,s,c)}]^T$ which corresponds to a mobile station with q-th user specific scrambling in the s-th sector of the c-th cell may defined as follows. If sector specific scrambling is utilized:

$$Z_{k,(q,s,c)} = S_{k,q} \cdot X_{k,s} \cdot Y_{k,c}, \quad 1 \leq k \leq N_p, 1 \leq s \leq S, c=1,2, \quad (1)$$

If sector specific scrambling is not utilized:

$$Z_{k,(q,s,c)} = S_{k,q} \cdot Y_{k,c}, \quad 1 \leq k \leq N_p, 1 \leq s \leq, c=1,2, \quad (2)$$

Unlike user specific and sector specific scrambling, no particular optimization of cell specific scrambling sequences need be utilized. The two design parameters that may be utilized are that:
  All the elements of cell specific scrambling sequences have equal modulus.
  Cell specific scrambling sequences differ substantially for different cells.

Based on the above, the base station controller 730 may know each cell specific scrambling sequence and decode those pilot symbols which are not decoded by a specific base station.

Although FIG. 7 depicts having the same pilot pattern in each sector of each base station, an approach similar to FIGS. 5A, 5B, or 5C may be utilized for each base station.

Figure 8:
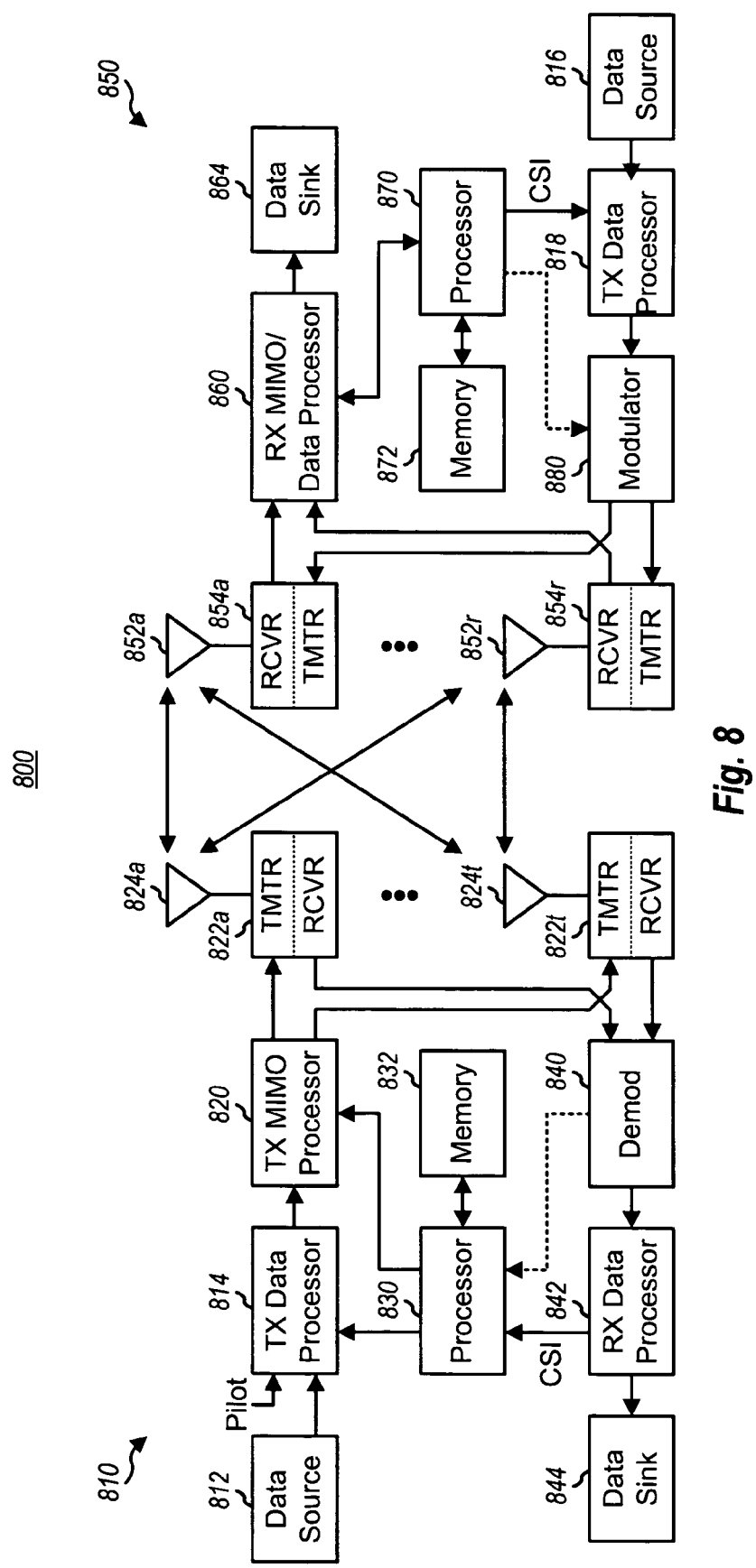
FIG. 8 illustrates a block diagram of an embodiment of a transmitter system and a receiver system in a multi-input multi-output multiple access wireless communication system according to an embodiment.

Referring to FIG. 8, a block diagram of an embodiment of a transmitter system 810 and a receiver system 850 in a MIMO system 800 is illustrated. At transmitter system 810, traffic data for a number of data streams is provided from a data source 812 to transmit (TX) data processor 814. In an embodiment, each data stream is transmitted over a respective transmit antenna. TX data processor 814 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed on provided by processor 830.

The modulation symbols for all data streams are then provided to a TX processor 820, which may further process the modulation symbols (e.g., for OFDM). TX processor 820 then provides $N_T$ modulation symbol streams to $N_T$ transmitters (TMTR) 822a through 822t. Each transmitter 822 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 822a through 822t are then transmitted from $N_T$ antennas 824a through 824t, respectively.

At receiver system 850, the transmitted modulated signals are received by $N_R$ antennas 852a through 852r and the received signal from each antenna 852 is provided to a respective receiver (RCVR) 854. Each receiver 854 conditions (e.g., filters, amplifies, and downconverts) a respective received signal, digitizes the conditioned signal to provide samples, and further processes the samples to provide a corresponding "received" symbol stream.

An RX data processor 860 then receives and processes the $N_R$ received symbol streams from $N_R$ receivers 854 based on a particular receiver processing technique to provide $N_T$ "detected" symbol streams. The processing by RX data processor 860 is described in further detail below. Each detected symbol stream includes symbols that are estimates of the modulation symbols transmitted for the corresponding data stream. RX data processor 860 then demodulates, deinterleaves, and decodes each detected symbol stream to recover the traffic data for the data stream. The processing by RX data processor 818 is complementary to that performed by TX processor 820 and TX data processor 814 at transmitter system 810.

RX processor 860 may derive an estimate of the channel response between the $N_T$ transmit and $N_R$ receive antennas, e.g., based on the pilot information multiplexed with the traffic data. RX processor 860 may identify the pilot symbols according to pilot patterns stored in memory, e.g. memory 872 that identify the frequency subcarrier and symbol period assigned to each pilot symbol. In addition, the user specific and sector specific scrambling sequences may be stored in memory so that they may be utilized by RX processor 860 to multiple the received symbols so that the proper decoding can occur.

To decode the pilot and data symbols during handoff, the RX processor 860 and processor 870 may separately extract the pilot symbols from each sector that uses one of the pilot patterns assigned for handoff. The pilot symbols, and associated data symbols, that are transmitted according one of the pilot patterns assigned for handoff are decoded for each sector and may then be combined from all of the sectors. The combining may be performed, as previously stated, by utilizing maximum ratio combining (MRC) or other known techniques.

The channel response estimate generated by RX processor 860 may be used to perform space, space/time processing at the receiver, adjust power levels, change modulation rates or schemes, or other actions. RX processor 860 may further estimate the signal-to-noise-and-interference ratios (SNRs) of the detected symbol streams, and possibly other channel characteristics, and provides these quantities to a processor 870. RX data processor 860 or processor 870 may further derive an estimate of the "operating" SNR for the system. Processor 870 then provides channel state information (CSI), which may comprise various types of information regarding the communication link and/or the received data stream. For example, the CSI may comprise only the operating SNR. The CSI is then processed by a TX data processor 878, modulated by a modulator 880, conditioned by transmitters 854a through 854r, and transmitted back to transmitter system 810.

In addition the SNR estimates may be utilized to determine a location of a mobile station, which is transmitting the pilot symbols, within a cluster of a cell or a cell. This information then can be utilized to determine a pilot pattern to assign to the mobile station. In some embodiments, memories 832 and 872 may contain identifiers that correspond to the different pilot patterns that may be utilized within the wireless communication systems. The memories can identify the pilot patterns based upon whether they are to be used for handoff or if the location of the mobile station indicates that it is near a cell or sector boundary. The pilot patterns may also have the same pilot symbol locations but have user specific and/or sector specific scrambling sequences, depending on how the different pilot patterns are distinguished from each other. These identifiers may then be transmitted from the transmitter to the receiver and then utilized by the receiver to modulate the pilot symbols according to the identified pilot pattern.

At transmitter system 810, the modulated signals from receiver system 850 are received by antennas 824, conditioned by receivers 822, demodulated by a demodulator 840, and processed by a RX data processor 842 to recover the CSI reported by the receiver system. The reported CSI is then provided to processor 830 and used to (1) determine the data rates and coding and modulation schemes to be used for the data streams and (2) generate various controls for TX data processor 814 and TX processor 820.

Processors 830 and 870 direct the operation at the transmitter and receiver systems, respectively. Memories 832 and 872 provide storage for program codes and data used by processors 830 and 870, respectively. The memories 832 and 872 store the pilot patterns in terms of cluster locations, user specific scrambling sequences, sector specific scrambling sequences, if utilized, and cell specific scrambling sequences, if utilized.

Processors 830 and 870 then can select which of the pilot patterns, user specific scrambling sequences, sector specific scrambling sequences, and cell specific scrambling sequences are to be utilized in transmission of the pilot symbols.

At the receiver, various processing techniques may be used to process the $N_R$ received signals to detect the $N_T$ transmitted symbol streams. These receiver processing techniques may be grouped into two primary categories (i) spatial and space-time receiver processing techniques (which are also referred to as equalization techniques); and (ii) "successive nulling/equalization and interference cancellation" receiver processing technique (which is also referred to as "successive interference cancellation" or "successive cancellation" receiver processing technique).

While FIG. 8 discusses a MIMO system, the same system may be applied to a multi-input single-output system where multiple transmit antennas, e.g. those on a base station, transmit one or more symbol streams to a single antenna device, e.g. a mobile station. Also, a single output to single input antenna system may be utilized in the same manner as described with respect to FIG. 8.

Figure 9A:
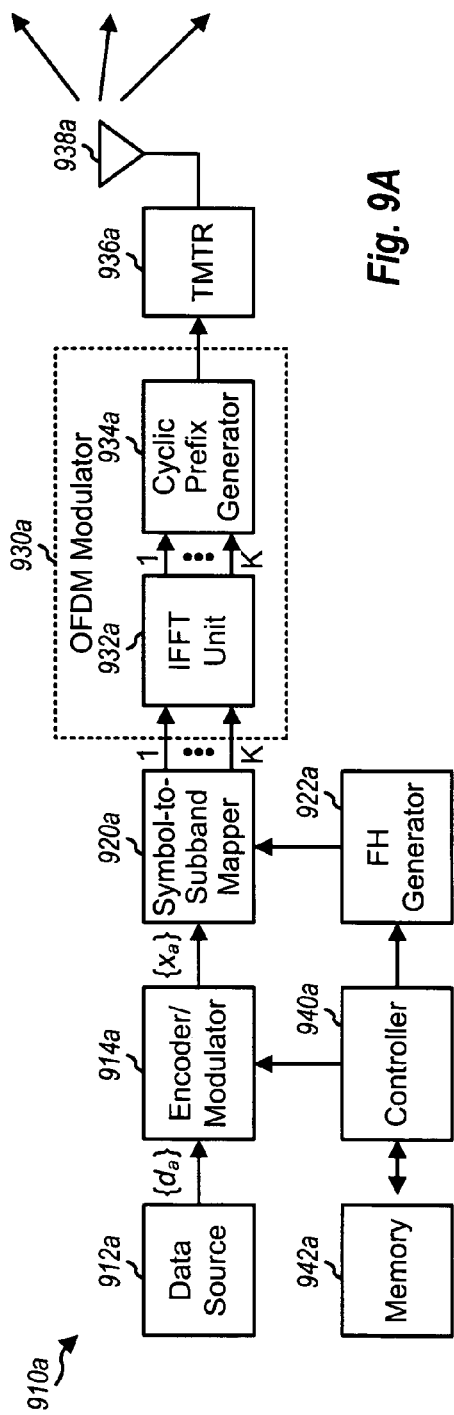
FIG. 9A illustrates a block diagram of a single-antenna mobile station according to an embodiment.
Figure 9B:
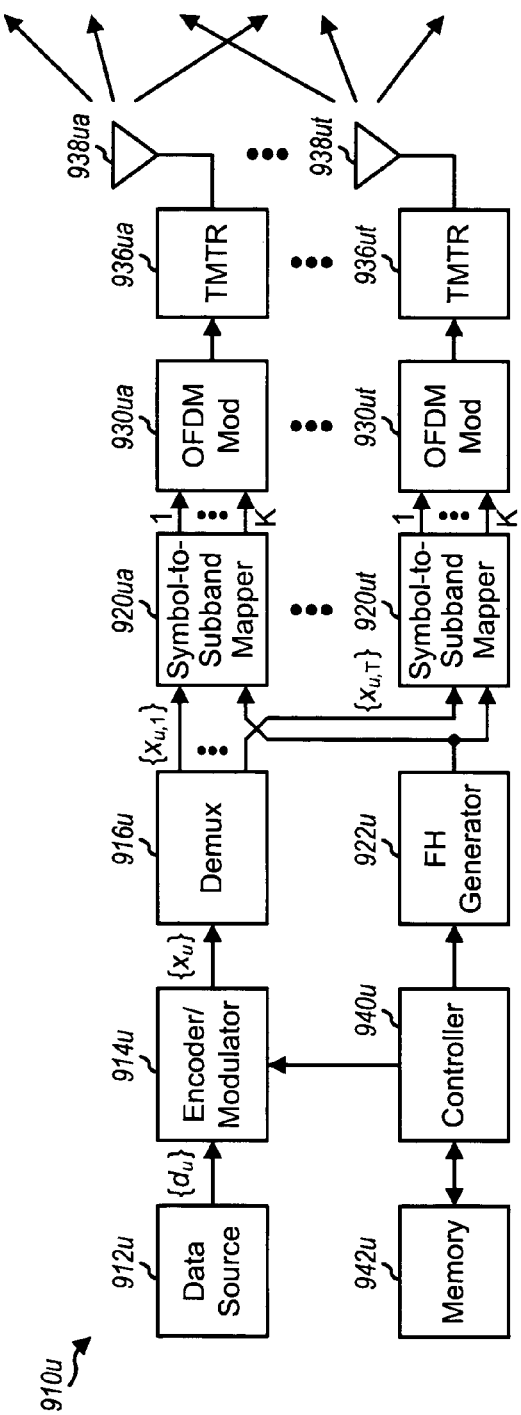
FIG. 9B illustrates a block diagram of a multi-antenna station according to an embodiment.
Figure 10:
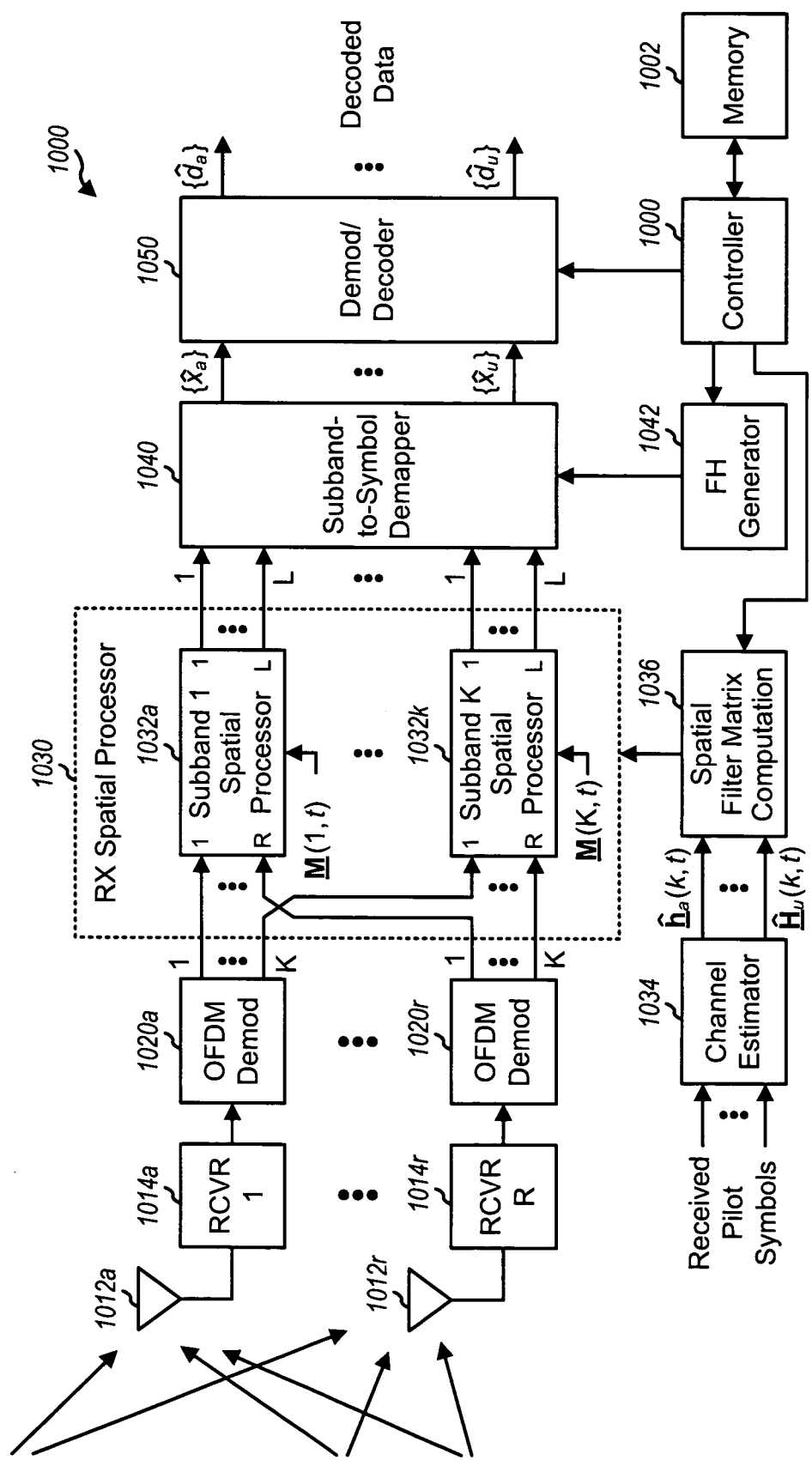
FIG. 10 illustrates a block diagram of a base station according to an embodiment.

Referring to FIGS. 9A, 9B, and 10, if a base station is equipped with multiple antennas for data reception, then the data transmissions from multiple users may be separated using various receiver spatial processing techniques. If a single antenna mobile station (FIG. 9A) is utilized, a single-input multiple-output (SIMO) channel is formed between single-antenna mobile station 910a and multi-antenna base station 1000 (FIG. 10). The SIMO channel may be characterized by an R×1 channel response vector $\underline{h}_a(k, t)$ for each subband, which may be expressed as:

$$\underline{h}_a(k, t) = \begin{bmatrix} h_{a,1}(k, t) \\ h_{a,2}(k, t) \\ \vdots \\ h_{a,R}(k, t) \end{bmatrix}, \text{ for } k = 1 \ldots K, \quad \text{Eq (1)}$$

where k is an index for subband, and $h_{a,i}(k,t)$, for i=1 ... R, is the coupling or complex channel gain between the single antenna at mobile station 910a and the R antennas at base station 1000 for subband k in hop period t.

A multiple-input multiple-output (MIMO) channel is formed between multi-antenna mobile station 910u (FIG. 9B) and multi-antenna base station 1000. The MIMO channel for mobile station 910u may be characterized by an R×T channel response matrix $\underline{H}_u(k,t)$ for each subband, which may be expressed as:

$$\underline{H}_u(k,t) = [\underline{h}_{u,1}(k,t) \underline{h}_{u,2}(k,t) \ldots \underline{h}_{u,T}(k,t)], \text{ for } k=1 \ldots K, \quad \text{Eq (2)}$$

where $\underline{h}_{u,j}(k, t)$, for j=1 ... T, is the channel response vector between antenna j at mobile station 910u and the R antennas at base station 1000 for subband k in hop period t. Each channel response vector $\underline{h}_{u,j}(k, t)$ contains R elements and has the form shown in equation (4).

In general, each mobile station may be equipped with one or multiple antennas and may be assigned S subbands in each hop period, where S≧1. Each mobile station may then have one set of channel response vectors for each antenna, with each vector set containing S channel response vectors for the S subbands assigned to the mobile station for hop period t. For example, if mobile station m is assigned S subbands with indices k through k+S−1 in hop period t, then the vector set for each antenna j of mobile station m would contain S channel response vectors $\underline{h}_{m,j}(k, t)$ through $\underline{h}_{m,j}(k+S-1, t)$ for subbands k through k+S−1, respectively. These S channel response vectors are indicative of the channel response between antenna j at mobile station m and the R antennas at the base station for the S subbands assigned to mobile station m. The subband index k for mobile station m changes in each hop period and is determined by the FH sequence assigned to mobile station m.

The channel response vectors for the multiple mobile stations selected for simultaneous data transmission are typically different from one another and may be viewed as "spatial signatures" for these U mobile stations. The base station may estimate the channel response vectors for each mobile station based on pilot symbols received from the mobile stations, which may be time division multiplexed with data symbols as depicted in FIGS. 3A, 3B, 4A, and 4B.

For simplicity, the following description assumes that L=U/N and L single-antenna mobile stations $m_1$ through $m_L$ are assigned to each subband group in each hop period. An R×L channel response matrix $\underline{H}(k, t)$ may be formed for each subband k in each hop period t based on the L channel response vectors for the L mobile stations using subband k in hop period t, as follows:

$$\underline{H}(k, t) = [\underline{h}_{m_1}(k, t) \ \underline{h}_{m_2}(k, t) \ \ldots \ \underline{h}_{m_L}(k, t)],$$

$$= \begin{bmatrix} h_{m_1,1}(k, t) & h_{m_2,1}(k, t) & \cdots & h_{m_L,1}(k, t) \\ h_{m_1,2}(k, t) & h_{m_2,2}(k, t) & \cdots & h_{m_L,2}(k, t) \\ \vdots & \vdots & \ddots & \vdots \\ h_{m_1,R}(k, t) & h_{m_2,R}(k, t) & \cdots & h_{m_L,R}(k, t) \end{bmatrix}, \quad \text{Eq (3)}$$

for $k = 1 \ldots K$, where $\underline{h}_{m_l}(k,t)$, for $l=1 \ldots L$, is the channel response vector for the l-th mobile station using subband k in hop period t. The channel response matrix $\underline{H}(k,t)$ for each subband in each hop period is dependent on the specific set of mobile stations assigned to that subband and hop period.

The "received" symbols at the base station for each subband k in each symbol period n of each hop period t may be expressed as:

$$\underline{r}(k,t,n) = \underline{H}(k,t) \cdot \underline{x}(k,t,n) + \underline{n}(k,t,n), \text{ for } k=1 \ldots K, \quad \text{Eq (4)}$$

where $\underline{x}(k, t, n)$ is a vector with L "transmit" symbols sent by the L mobile stations on subband k in symbol period n of hop period t; $\underline{r}(k,t,n)$ is a vector with R received symbols obtained via the R antennas at the base station for subband k in symbol period n of hop period t; and $\underline{n}(k, t, n)$ is a noise vector for subband k in symbol period n of hop period t.

For simplicity, the channel response matrix $\underline{H}(k,t)$ is assumed to be constant for an entire hop period and is not a function of symbol period n. Also for simplicity, the noise may be assumed to be additive white Gaussian noise (AWGN) with a zero mean vector and a covariance matrix of $\underline{\phi}_{nn} = \sigma^2 \cdot \underline{I}$, where $\sigma^2$ is the variance of the noise and $\underline{I}$ is the identity matrix.

K transmit symbol vectors, $\underline{x}(k,t,n)$ for $k=1 \ldots K$, are formed for the K subbands in each symbol period of each hop period. Because different sets of mobile stations may be assigned to different subbands in a given hop period, as determined by their FH sequences, the K transmit symbol vectors $\underline{x}(k, t, n)$ for each symbol period of each hop period may be formed by different sets of mobile stations. Each vector $\underline{x}(k, t, n)$ contains L transmit symbols sent by the L mobile stations using subband k in symbol period n of hop period t. In general, each transmit symbol may be a data symbol, a pilot symbol, or a "zero" symbol (which is a signal value of zero).

K received symbol vectors, $\underline{r}(k, t, n)$ for $k=1 \ldots K$, are obtained for the K subbands in each symbol period of each hop period. Each vector $\underline{r}(k, t, n)$ contains R received symbols obtained via the R antennas at the base station for one subband in one symbol period. For a given subband k, symbol period n, and hop period t, the j-th transmit symbol in the vector $\underline{x}(k, t, n)$ is multiplied by the j-th vector/column of the channel response matrix $\underline{H}(k, t)$ to generate a vector $\underline{r}_j(k, t, n)$. The L transmit symbols in $\underline{x}(k, t, n)$, which are sent by L different mobile stations, are multiplied by the L columns of $\underline{H}(k, t)$ to generate L vectors $\underline{r}_1(k, t, n)$ through $\underline{r}_L(k, t, n)$, one vector $\underline{r}_j(k, t, n)$ for each mobile station. The vector $\underline{r}(k, t, n)$ obtained by the base station is composed of the L vectors $\underline{r}_1(k, t, n)$ through $\underline{r}_L(k,t, n)$, or $$\underline{r}(k, t, n) = \sum_{j=1}^{L} \underline{r}_j(k, t, n).$$

Each received symbol in $\underline{r}(k, t, n)$ thus contain a component of each of the L transmit symbols in $\underline{x}(k, t, n)$. The L transmit symbols sent simultaneously by the L mobile stations on each subband k in each symbol period n of each hop period t thus interfere with one another at the base station.

The base station may use various receiver spatial processing techniques to separate out the data transmissions sent simultaneously by the L mobile stations on each subband in each symbol period. These receiver spatial processing techniques may include a zero-forcing (ZF) technique, a minimum mean square error (MMSE) technique, a maximal ratio combining (MRC) technique, or other known techniques.

For the zero-forcing technique, the base station may derive a spatial filter matrix $\underline{M}_{zf}(k,t)$ for each subband k in each hop period t, as follows:

$$\underline{M}_{zf}(k,t) = [\underline{H}^H(k,t) \cdot \underline{H}(k,t)]^{-1} \cdot \underline{H}^H(k,t), \quad \text{Eq (5)}$$

where "$^H$" denotes a conjugate transpose. The base station estimates the channel response matrix $\underline{H}(k, t)$ for each subband, e.g., based on pilots transmitted by the mobile stations. The spatial processing of pilot symbols may be any manner as previously described herein.

The base station then uses the estimated channel response matrix $\hat{\underline{H}}(k,t)$ to derive the spatial filter matrix. For clarity, the following description assumes no estimation error so that $\hat{\underline{H}}(k, t) = \underline{H}(k, t)$. Because $\underline{H}(k, t)$ is assumed to be constant across hop period t, the same spatial filter matrix $\underline{M}_{zf}(k, t)$ may be used for all symbol periods in hop period t.

The base station may perform zero-forcing processing for each subband k in each symbol period n of each hop period t, as follows:

$$\begin{aligned}\hat{\underline{x}}_{zf}(k, t, n) &= \underline{M}_{zf}(k, t) \cdot \underline{r}(k, t, n), \\ &= [\underline{H}^H(k, t) \cdot \underline{H}(k, t)]^{-1} \cdot \underline{H}^H(k, t) \cdot \\ &\quad [\underline{H}(k, t) \cdot \underline{x}(k, t, n) + \underline{n}(k, t, n)], \\ &= \underline{x}(k, t, n) + \underline{n}_{zf}(k, t, n),\end{aligned} \quad \text{Eq (6)}$$

where $\hat{\underline{x}}_{zf}(k, t, n)$ is a vector with L "detected" data symbols for subband k in symbol period n of hop period t; and $\underline{n}_{zf}(k, t, n)$ is the noise after the zero-forcing processing. A detected data symbol is an estimate of a data symbol sent by a mobile station.

For the MMSE technique, the base station may derive a spatial filter matrix $\underline{M}_{mmse}(k, t)$ for each subband k in each hop period t, as follows:

$$\underline{M}_{mmse}(k, t) = [\underline{H}^H(k,t) \cdot \underline{H}(k, t) + \sigma^2 \cdot \underline{I}]^{-1} \cdot \underline{H}^H(k, t). \quad \text{Eq (7)}$$

If the covariance matrix $\underline{\phi}_{nn}$ of the noise is known, then this covariance matrix may be used in place of $\sigma^2 \cdot \underline{I}$ in equation (10).

The base station may perform MMSE processing for each subband k in each symbol period n of each hop period t, as follows:

$$\hat{x}_{mmse}(k, t, n) = \underline{D}_{mmse}^{-1}(k, t) \cdot \underline{M}_{mmse}(k, t) \cdot \underline{r}(k, t, n), \quad \text{Eq (8)}$$
$$= \underline{D}_{mmse}^{-1}(k, t) \cdot \underline{M}_{mmse}(k, t) \cdot [\underline{H}(k, t) \cdot$$
$$\underline{x}(k, t, n) + \underline{n}(k, t, n)],$$
$$\cong \underline{x}(k, t, n) + \underline{n}_{mmse}(k, t, n),$$

where $\underline{D}_{mmse}$ (k, t) is a diagonal vector containing the diagonal elements of a matrix $[\underline{M}_{mmse}$ (k, t)·$\underline{H}$(k, t)], or $\underline{D}_{mmse}$ (k, t)=diag $[\underline{M}_{mmse}$ (k, t)·$\underline{H}$(k, t)]; and $\underline{n}_{mmse}$ (k, t, n) is the noise after the MMSE processing.

The symbol estimates from the spatial filter $\underline{M}_{mmse}$ (k, t) are unnormalized estimates of the transmit symbols in $\underline{x}$(k, t, n). The multiplication with the scaling matrix $\underline{D}_{mmse}^{-1}$ (k, t) provides normalized estimates of the transmit symbols.

For the MRC technique, the base station may derive a spatial filter matrix $\underline{M}_{mrc}$ (k, t) for each subband k in each hop period t, as follows:

$$\underline{M}_{mrc}(k, t) = \underline{H}^H(k, t). \quad \text{Eq (9)}$$

The base station may perform MRC processing for each subband k in each symbol period n of each hop period t, as follows:

$$\hat{x}_{mrc}(k, t, c) = \underline{D}_{mrc}^{-1}(k, t) \cdot \underline{M}_{mrc}(k, t) \cdot \underline{r}(k, t, n), \quad \text{Eq (10)}$$
$$= \underline{D}_{mrc}^{-1}(k, t) \cdot \underline{H}^H(k, t) \cdot [\underline{H}(k, t) \cdot \underline{x}(k, t, n) +$$
$$\underline{n}(k, t, n)],$$
$$\cong \underline{x}(k, t, n) + \underline{n}_{mrc}(k, t, n),$$

where $\underline{D}_{mrc}$ (k,t) is a diagonal vector containing the diagonal elements of a matrix $[\underline{H}^H$ (k, t)·$\underline{H}$(k, t)], or $\underline{D}_{mrc}$ (k, t)=diag [ $\underline{H}^H$ (k, t)·$\underline{H}$(k, t)]; and $\underline{n}_{mrc}$ (k, t, n) is the noise after the MRC processing.

As shown above, the multiple data transmissions sent simultaneously from up to L mobile stations on each subband k in each symbol period n of each hop period t may be separated by the base station based on their uncorrelated spatial signatures, which are given by their channel response vectors $\underline{h}_{m_l}$ (k, t). This allows a higher capacity when the number of antennas used for data reception increases. Furthermore, this approach may reduce the amount of intra-cell interference observed on each subband in each hop period so that better utilization of the additional capacity created in the spatial dimension can be achieved.

At each base station, the above processing techniques may be performed by generated the estimated matrices utilizing symbol data received at each antenna group, i.e. those for different sectors. For example, if a mobile station is in handoff its pilot and data symbols are received at multiple antenna groups. Since the pilot symbols received at each the decoded data symbols may be generated by combining the data symbols received at each antenna group.

In the case of a soft handoff across multiple cells, each cell or sector within a cell may decode the data symbols. Then a base station controller that controls the cells may combine the decoded symbols or may use a symbol decoded at one of the cells without regard to decoding performed at the other cell or cells for that mobile station. Alternatively, it may combine the decoded symbols from multiple base stations.

FIGS. 9A and 9B illustrate block diagrams of embodiments of single-antenna mobile station 910a and multi-antenna mobile station 910u respectively. At single-antenna mobile station 910a, an encoder/modulator 914a receives traffic/packet data (denoted as $\{d_a\}$) from a data source 912a and possibly overhead/signaling data from a controller 940a, processes (e.g., encodes, interleaves, and symbol maps) the data based on one or more coding and modulation schemes selected for mobile station 910a, and provides data symbols (denoted as $\{x_a\}$) for mobile station 910a. Each data symbol is a modulation symbol, which is a complex value for a point in a signal constellation for a modulation scheme (e.g., M-PSK or M-QAM).

A symbol-to-subband mapper 920a receives the data symbols and pilot symbols and provides these symbols onto the proper subband(s) in each symbol period of each hop period, as determined by an FH control from an FH generator 922a. FH generator 922a may generate the FH control based on an FH sequence or a traffic channel assigned to mobile station 910a. FH generator 922a may be implemented with look-up tables, PN generators, and so on. Mapper 920a also provides a zero symbol for each subband not used for pilot or data transmission. For each symbol period, mapper 920a outputs K transmit symbols for the K total subbands, where each transmit symbol may be a data symbol, a pilot symbol, or a zero symbol.

An OFDM modulator 930a receives K transmit symbols for each symbol period and generates a corresponding OFDM symbol for that symbol period. OFDM modulator 930a includes an inverse fast Fourier transform (IFFT) unit 932 and a cyclic prefix generator 934. For each symbol period, IFFT unit 932 transforms K transmit symbols to the time domain using a K-point IFFT to obtain a "transformed" symbol that contains K time-domain samples. Each sample is a complex value to be transmitted in one sample period. Cyclic prefix generator 934 repeats a portion of each transformed symbol to form an OFDM symbol that contains N+C samples, where C is the number of samples being repeated. The repeated portion is often called a cyclic prefix and is used to combat ISI caused by frequency selective fading. An OFDM symbol period (or simply, a symbol period) is the duration of one OFDM symbol and is equal to N+C sample periods. OFDM modulator 930a provides a stream of OFDM symbols to a transmitter unit (TMTR) 936a. Transmitter unit 936a processes (e.g., converts to analog, filters, amplifies, and frequency upconverts) the OFDM symbol stream to generate a modulated signal, which is transmitted from an antenna 938a.

At multi-antenna mobile station 910u, an encoder/modulator 914u receives traffic packet data (denoted as $\{d_u\}$) from a data source 912u and possibly overhead/signaling data from a controller 940u, processes the data based on one or more coding and modulation schemes selected for mobile station 910u, and provides data symbols (denoted as $\{x_u\}$) for mobile station 910u. A demultiplexer (Demux) 916u demultiplexes the data symbols into T streams for the T antennas at mobile station 910u, one data symbol stream $\{x_{u,j}\}$ for each antenna, and provides each data symbol stream to a respective symbol-to-subband mapper 920u. Each mapper 920u receives the data symbols and pilot symbols for its antenna and provides these symbols onto the proper subband(s) in each symbol period of each hop period, as determined by an FH control generated by an FH generator 922u based on an FH sequence or a traffic channel assigned to mobile station 910u. Up to T different data symbols or pilot symbols may be sent from the T antennas in each symbol period on each subband assigned to mobile station 910u. Each mapper 920u also provides a zero symbol for each subband not used for pilot or data transmission and, for each symbol period, outputs K transmit symbols for the K total subbands to a corresponding OFDM modulator 930u.

Each OFDM modulator 930u receives K transmit symbols for each symbol period, performs OFDM modulation on the K transmit symbols, and generates a corresponding OFDM symbol for the symbol period. T OFDM modulators 930ua through 930ut provide T streams of OFDM symbols to T transmitter units 936ua through 936ut, respectively. Each transmitter unit 936u processes its OFDM symbol stream and generates a corresponding modulated signal. T modulated signals from transmitter units 536ua through 536ut are transmitted from T antennas 938ua through 938ut, respectively.

Controllers 940a and 940u direct the operation at mobile stations 910a and 910u, respectively. Memory unit 942a and 942u provide storage for program codes and data used by controllers 940a and 940u, respectively.

Referring to FIG. 10, a block diagram of an embodiment of base station 1000 is illustrated. The modulated signals transmitted by the U mobile stations selected for data transmission are received by R antennas 1012a through 1012r, and each antenna provides a received signal to a respective receiver unit (RCVR) 1014. Each receiver unit 1014 processes (e.g., filters, amplifies, frequency downconverts, and digitizes) its received signal and provides a stream of input samples to an associated OFDM demodulator (Demod) 1020. Each OFDM demodulator 1020 processes its input samples and provides received symbols. Each OFDM demodulator 1020 typically includes a cyclic prefix removal unit and a fast Fourier transform (FFT) unit. The cyclic prefix removal unit removes the cyclic prefix in each received OFDM symbol to obtain a received transformed symbol. The FFT unit transforms each received transformed symbol to the frequency domain with a K-point FFT to obtain K received symbols for the K subbands. For each symbol period, R OFDM demodulators 1020a through 1020r provide R sets of K received symbols for the R antennas to a receive (RX) spatial processor 1030.

Receive (RX) spatial processor 1030 includes K subband spatial processors 1032a through 1032k for the K subbands. Within RX spatial processor 1030, the received symbols from OFDM demodulators 1020a through 1020r for each symbol period are demultiplexed into K vectors of received symbols, $\underline{r}(k, t, n)$ for k=1 ... K, which are provided to the K spatial processors 1032. Each spatial processor 10632 also receives a spatial filter matrix $\underline{M}(k, t)$ for its subband, performs receiver spatial processing on $\underline{r}(k, t, n)$ with $\underline{M}(k, t)$ as described above, and provides a vector $\underline{\hat{x}}(k, t, n)$ of detected data symbols. For each symbol period, K spatial processors 1032 through 10632k provide K sets of detected data symbols in K vectors $\underline{\hat{x}}(k, t, n)$ for the K subbands to a subband-to-symbol demapper 1040.

Demapper 1040 obtains the K sets of detected data symbols for each symbol period and provides detected data symbols for each mobile station m onto a stream $\{\hat{x}_m\}$ for that mobile station, where m ∈ {a ... u}. The subbands used by each mobile station are determined by an FH control generated by an FH generator 1042 based on the FH sequence or traffic channel assigned to that mobile station. A demodulator/decoder 10650 processes (e.g., symbol demaps, deinterleaves, and decodes) the detected data symbols $\{\hat{x}_m\}$ for each mobile station and provides decoded data $\{d_m\}$ for the mobile station.

A channel estimator 1034 obtains received pilot symbols from OFDM demodulators 1020a through 1020r and derives a channel response vector for each antenna of each mobile station transmitting to base station 1000 based on the received pilot symbols for the mobile station. A spatial filter matrix computation unit 1036 forms a channel response matrix $\underline{H}(k, t)$ for each subband in each hop period based on the channel response vectors of all mobile stations using that subband and hop period. Computation unit 1036 then derives the spatial filter matrix $\underline{M}(k, t)$ for each subband of each hop period based on the channel response matrix $\underline{H}(k, t)$ for that subband and hop period and further using the zero-forcing, MMSE, or MRC technique, as described above. Computation unit 1036 provides K spatial filter matrices for the K subbands in each hop period to K subband spatial processors 1032a through 1032k.

A controller 1060 directs the operation at base station 1000 and other base stations, which are generally proximate to base station 1000. A memory unit 1062 provides storage for program codes and data used by controller 1060. In the case of a soft handoff across multiple cells, controller 1060 may combine the decoded symbols or may use a symbol decoded at base station without regard to decoding performed at the other cell or cells for that mobile station. Alternatively, it may combine the decoded symbols from multiple base stations.

Figure 11:
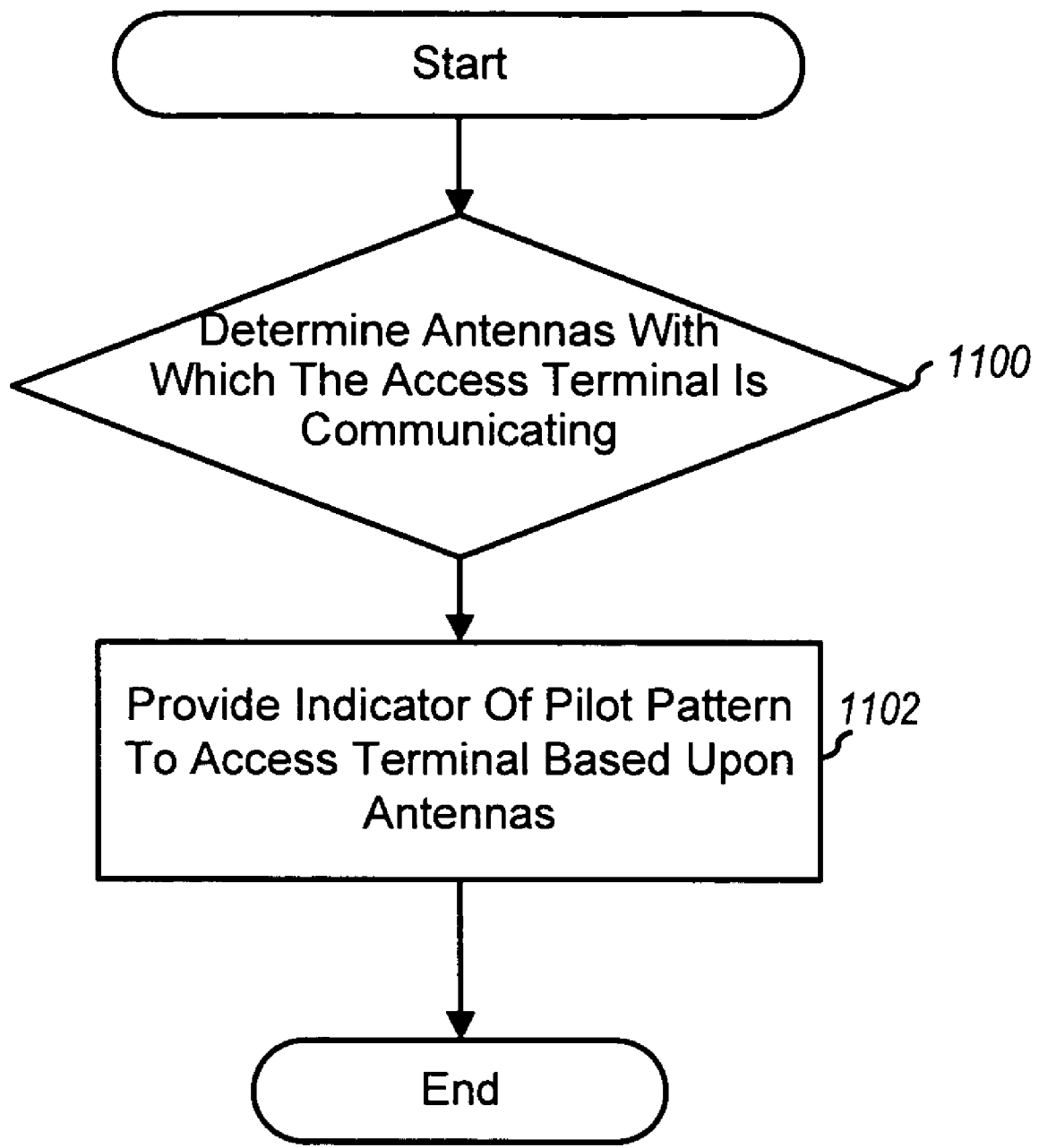
FIG. 11 illustrates a flow chart of a method of pilot pattern assignment according to one embodiment.

Referring to FIG. 11, a flow chart of a method of pilot symbol assignment according to one embodiment is illustrated. A determination is made with which antenna group, or within which sector, an access terminal is communicating, block 1100. This determination may be made using known techniques, or may be assigned by the access point. Based upon the information, a pilot pattern is assigned to the access terminal, block 1102. The pilot pattern may be an only pilot pattern for the sector or one of many pilot patterns assigned to the sector.

Figure 12:
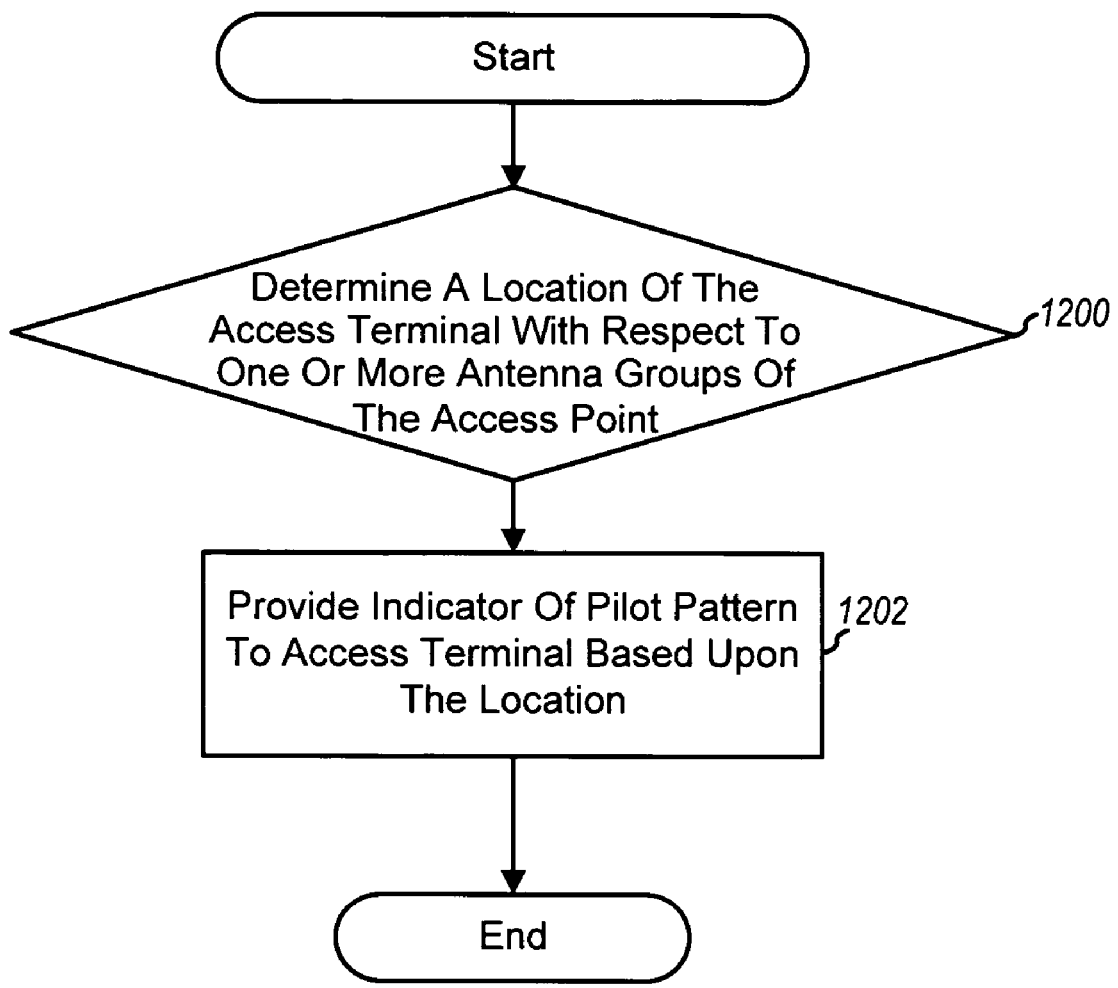
FIG. 12 illustrates a flow chart of a method of pilot pattern assignment according to another embodiment.

Referring to FIG. 12 a flow chart of a method of pilot symbol assignment according to another embodiment is illustrated. A determination is made as to the location of an access terminal, block 1200. This may be based upon determining a distance between the access terminal and one or more antenna groups of the access point, for example by determining signal strength or signal-to-noise ratios. Further, the determination may be made based upon whether the access terminal is near a boundary between one or more sectors of the access point. In other embodiments, this may be done by utilizing quality of service requirements to select the indicator of the plurality of indicators, channel quality information received from the access terminal, or other signal quality indicators such as SNR or the like.

Based upon the information, a pilot pattern is assigned to the access terminal, block 1202. The pilot pattern assigned may be unique to the boundary between two or more sectors, the same for all boundaries for all the sectors of an access point, or a mix thereof. Further, the specific pilot pattern assigned to those access terminals near the boundary may vary over time or based upon other system parameters. Those access terminal not near a boundary, may be assigned one or more of one or more pilot patterns allocated for access terminals that communicate with only one sector or antenna group.

Figure 13:
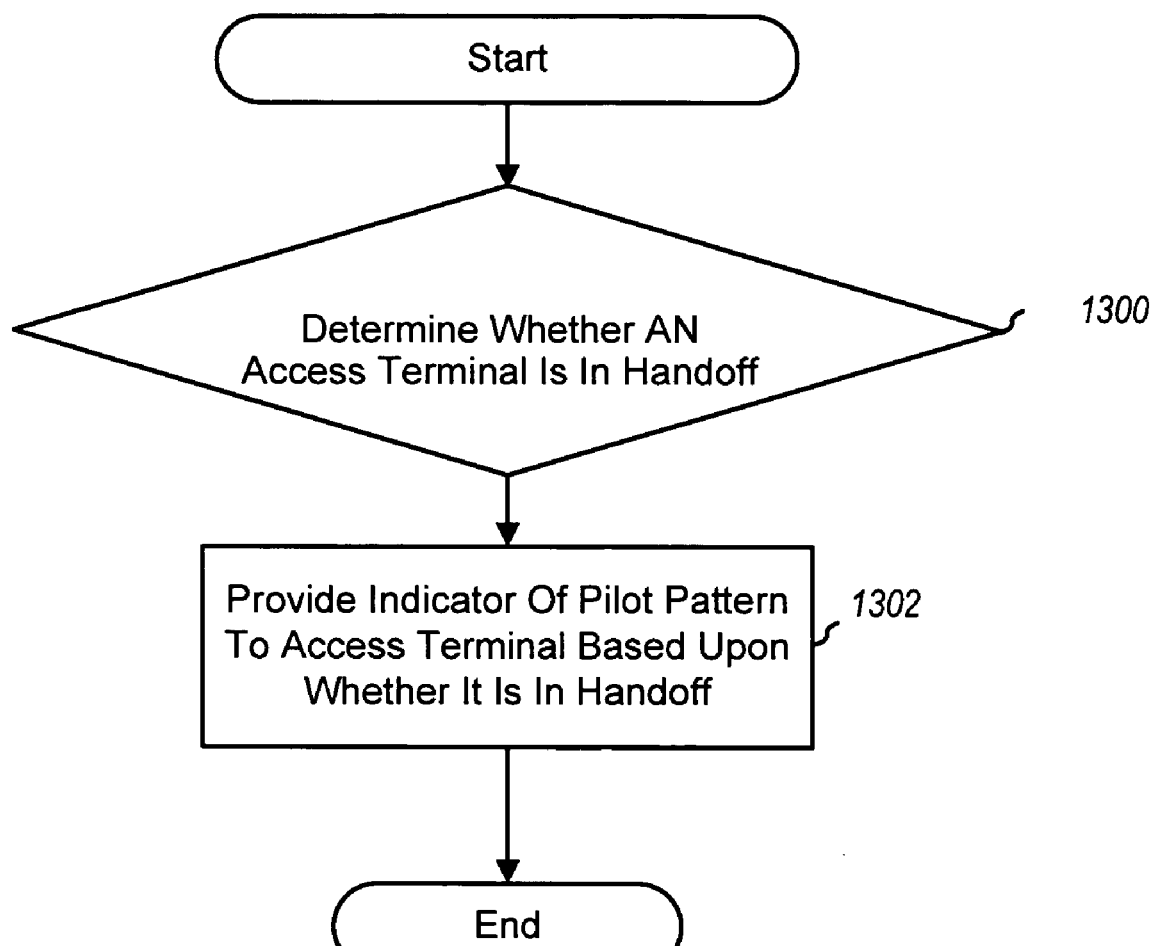
FIG. 13 illustrates a flow chart of a method of pilot pattern assignment according to an additional embodiment.

Referring to FIG. 13, a flow chart of a method of pilot symbol assignment according to an additional embodiment is illustrated. A determination is made as to the location of an access terminal, block 1300. This may be based upon determining a location of the access terminal and one or more antenna groups of the access point or by determining whether a request has been made for handoff.

Based upon the information, a pilot pattern is assigned to the access terminal, block 1302. The pilot pattern assigned for those in handoff may different than those not in handoff. For example, the pilot pattern may be unique to a handoff between any combination of sectors, the same for all for all handoffs between all the sectors of an access point, or a mix thereof.

Further, the specific pilot pattern assigned to those access terminals for handoff may vary over time or based upon other system parameters. Those access terminal not in handoff, may be assigned one or more of one or more pilot patterns allocated for access terminals that communicate with only one sector or antenna group.

The pilot patterns assigned in FIGS. 11-13, may comprise pilot symbol locations and either, both, or neither of user scrambling sequences and sector specific scrambling sequences. Also, the methods may be altered to apply to cells by substituting cells for sectors with respect to any of the blocks described with respect to FIGS. 11-13.

The techniques described herein may be implemented by various means. For example, these techniques may be implemented in hardware, software, or a combination thereof. For a hardware implementation, the processing units within a base station or a mobile station may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor via various means as is known in the art.

The previous description of the disclosed embodiments is provided to enable any person skilled in the art to make or use the present invention. Various modifications to these embodiments may be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A wireless communication apparatus, comprising:
a plurality of antenna groups each of which corresponds to a one of a plurality of sectors within a cell, wherein each of the plurality of sectors comprises a different area radially extending from the plurality of antenna groups;
a memory that stores a plurality of indicators each corresponding to a contiguous group of adjacent pilot symbols of a plurality of groups of pilot symbols in a hop region of pilot symbols for performing time-frequency hopping by a plurality of wireless communication devices during communication with the wireless communication apparatus; and
a circuit coupled with the plurality of antenna groups that selects an indicator of the plurality of indicators, to be transmitted to a wireless communication device in communication with one of the plurality of antenna groups based upon a location of the wireless communication device within a respective one of the plurality of sectors, to assign the wireless communication device to transmit using time-frequency hopping a group of pilot symbols to the wireless communication apparatus, wherein the contiguous group of adjacent pilot symbols corresponding to the indicator are selected at least one hop away from an edge of the hop region and allow the antenna group in the sector in which the wireless communication device is located to separate pilot signatures of different wireless communication devices overlapping on the same hop region.

2. The wireless communication apparatus of claim 1, wherein the circuit selects a specific one of the indicators when the wireless communication device is near a boundary between two or more of the plurality of sectors.

3. The wireless communication apparatus of claim 2, wherein the wireless communication apparatus decodes a same symbol received, at antennas from two different groups of the antenna groups, from the wireless communication device.

4. The wireless communication apparatus of claim 2, wherein the circuit selects the specific one of the indicators, to be transmitted to a second wireless communication device in communication with one of the plurality of antenna groups, when the second wireless communication device is near a boundary between two or more of the plurality of sectors.

5. The wireless communication apparatus of claim 2, wherein the circuit selects a second specific indicator, to be transmitted to a. second wireless communication device in communication with one of the plurality of antenna groups, when the second wireless communication device is near a boundary between another two or more of the plurality of sectors that are different than the two or more of the plurality of sectors.

6. The wireless communication apparatus of claim 2, wherein each group of pilot symbols correspond to a different scrambling sequence of a plurality of scrambling sequences and wherein a group corresponding to the specific one of the indicators corresponds to a pre-determined scrambling sequence based upon the location.

7. The wireless communication apparatus of claim 2, wherein each group of pilot symbols correspond to a pattern of pilot symbol locations of a plurality of patterns of pilot symbol locations and wherein a group corresponding to the specific one of the indicators corresponds to a pre-determined pattern of pilot symbol locations that are based upon the location of the wireless communication device.

8. The wireless communication apparatus of claim 1, wherein the circuit comprises a processor.

9. The wireless communication apparatus of claim 1, wherein the wireless communication apparatus transmits signals according to an OFDM communication protocol.

10. The wireless communication apparatus of claim 1, wherein the circuit further utilizes quality of service requirements to select the indicator of the plurality of indicators.

11. The wireless communication apparatus of claim 1, wherein the circuit determines the location of the wireless communication device based upon channel quality information received from the wireless communication device.

12. The wireless communication apparatus of claim 1, wherein the plurality of groups of pilot symbols are each orthogonal to each other.

13. The wireless communication apparatus of claim 1, wherein the circuit decodes data symbols associated with the pilot symbols received at each of the plurality of antenna groups for each of the group of pilot symbols of the plurality of groups of pilot symbols and then combines decoded data symbols for a same group of pilot symbols received at each of the plurality of antenna groups.

14. The wireless communication apparatus of claim 1, wherein the circuit is further configured to select the contiguous group of pilot symbols from a plurality of contiguous groups of pilot symbols symmetric with respect to a center of the hop region.

15. A method of selecting a pilot pattern for a wireless communication device comprising:
- determining a location of a wireless communication device with respect to an antenna of a plurality of antennas, wherein each of the plurality of antennas corresponds to one of a plurality of sectors of a cell, wherein each of the plurality of sectors comprises a different area radially extending from the plurality of antennas;
- selecting a contiguous pilot pattern of adjacent pilot symbols of a plurality of pilot patterns in a hop region of pilot patterns to be utilized for time-frequency hopping transmission by the wireless communication device based upon the location, wherein the contiguous pilot pattern is selected at least one hop away from an edge of the hop region and allows the antenna in the sector in which the wireless communication device is located to separate pilot signatures of different wireless communication devices overlapping on the same hop region; and
- transmitting an indicator of the pilot pattern to the wireless communication device.

16. The method of claim 15, further comprising determining a location of the wireless communication device with respect to another antenna, and wherein selecting the pilot pattern comprises selecting the pilot pattern based upon the location with respect to the antenna and the location with respect to the another antenna.

17. The method of claim 16, wherein determining the location with respect to the antenna comprises determining a distance between the antenna and the wireless communication device and determining the location with respect to the another antenna comprises determining a distance between the another antenna and the wireless communication device.

18. The method of claim 15, wherein determining the location comprises determining the location based upon channel quality information.

19. The method of claim 18, wherein determining the location based upon channel quality information comprises determining a noise level.

20. The method of claim 18, wherein determining the location based upon channel quality information comprises determining a signal to noise ratio.

21. The method of claim 15, wherein determining the location comprises determining the location with respect to a sector boundary.

22. The method of claim 21, wherein selecting the pilot pattern comprises selecting an edge pilot pattern if the location is sufficiently close to the sector boundary.

23. The method of claim 15, wherein determining the location with respect to the antenna comprises determining a distance between the antenna and the wireless communication device.

24. The method of claim 15, wherein determining the distance comprises comparing a signal to noise ratio to a reference.

25. The method of claim 15, wherein selecting comprises selecting the pilot pattern based upon the location and based on a respective one of the plurality of antennas with which the wireless communication device is currently communicating.

26. The method of claim 15, wherein each pilot pattern of the plurality of pilot patterns is orthogonal with respect to each other pilot pattern of the plurality of pilot patterns.

27. The method of claim 15, wherein each pilot pattern of the plurality of pilot patterns is assigned a different scrambling sequence of a plurality of scrambling sequence than each other pilot pattern of the plurality of pilot patterns.

28. The method of claim 15, wherein selecting the contiguous pilot pattern is from a plurality of contiguous pilot patterns symmetric with respect to a center of the hop region.

29. A wireless communication apparatus comprising:
- means for determining a location of a wireless communication device with respect to an antenna of a plurality of antennas, wherein each of the plurality of antennas corresponds to one of a plurality of sectors of a cell, wherein each of the plurality of sectors comprises a different area radially extending from the plurality of antennas;
- means for selecting a contiguous pilot pattern of adjacent pilot symbols of a plurality of pilot patterns in a hop region of pilot patterns to be utilized for time-frequency hopping transmission by the wireless communication device based upon the location, wherein the contiguous pilot pattern is selected at least one hop away from an edge of the hop region and allows the antenna in the sector in which the wireless communication device is located to separate pilot signatures of different wireless communication devices overlapping on the same hop region; and
- means for transmitting an indicator of the pilot pattern to the wireless communication device.

30. The wireless communication apparatus of claim 29, further comprising means for determining a location of the wireless communication device with respect to another antenna of the wireless communication apparatus, and wherein the means for selecting comprises means for selecting the pilot pattern based upon the location with respect to the antenna and the location with respect to the another antenna.

31. The wireless communication apparatus of claim 30, wherein the means for determining the location with respect to the antenna comprises means for determining a distance between the antenna and the wireless communication device and the means for determining the location with respect to the another antenna comprises means for determining a distance between the another antenna and the wireless communication device.

32. The wireless communication apparatus of claim 29, wherein the means for determining the location comprises means for determining the location based upon channel quality information.

33. The wireless communication apparatus of claim 29, wherein the means for determining the location comprises means for determining the location with respect to a sector boundary.

34. The wireless communication apparatus of claim 29, wherein each pilot pattern of the plurality of pilot patterns is orthogonal with respect to each other pilot pattern of the plurality of pilot patterns.

35. The wireless communication apparatus of claim 29, wherein each pilot pattern of the plurality of pilot patterns is assigned a different scrambling sequence of a plurality of scrambling sequence than each other pilot pattern of the plurality of pilot patterns.

36. The wireless communication apparatus of claim 29, further comprising means for decoding data symbols received at each of the plurality of antenna groups associated with each of the pilot pattern of the plurality of pilot patterns and means for combining decoded symbols associated with a same pilot pattern received at each of the plurality of antenna groups.

37. The wireless communication apparatus of claim 29, wherein the means for selecting is further configured to select the contiguous group of pilot symbols from a plurality of contiguous groups of pilot symbols symmetric with respect to a center of the hop region.

38. A wireless communication apparatus, comprising:

a plurality of antenna groups each corresponding to one of a plurality of sectors of a cell, wherein each of the plurality of sectors comprises a different area radially extending from the plurality of antenna groups;

a memory that stores a plurality of indicators each corresponding to a contiguous pilot pattern of adjacent pilot symbols of a plurality of pilot patterns in a hop region of pilot patterns to be used for time-frequency hopping by a plurality of wireless communication devices communicating with the wireless communication apparatus; and a circuit coupled with the plurality of antenna groups that selects an indicator of the plurality of indicators, to be transmitted to a wireless communication device in communication with one of the plurality of antenna groups based upon which antenna group is in communication with the wireless communication device, wherein the contiguous pilot pattern is selected at least one hop away from an edge of the hop region and allows the antenna in the sector in which the wireless communication device is located to separate pilot signatures of different wireless communication devices overlapping on the same hop region.

39. The wireless communication apparatus of claim 38, wherein the wireless communication apparatus decodes pilot symbols received, at antennas from two different groups of the antenna groups, from the wireless communication device.

40. The wireless communication apparatus of claim 38, wherein the circuit selects a second specific indicator, to be transmitted to a second wireless communication device in communication with one of the plurality of antenna groups, when the second wireless communication device is in communication with a different antenna group than the wireless communication device.

41. The wireless communication apparatus of claim 40, wherein the at least two pilot patterns are different between each antenna group.

42. The wireless communication apparatus of claim 38, wherein the circuit comprises a processor.

43. The wireless communication apparatus of claim 38, wherein the wireless communication apparatus transmits signals according to an OFDM communication protocol.

44. The wireless communication apparatus of claim 38, wherein at least two pilot patterns are assigned for communication between wireless communication devices and each antenna group.

45. The wireless communication apparatus of claim 38, wherein only one pilot pattern is assigned for communication between wireless communication devices and each antenna group.

46. The wireless communication apparatus of claim 38, wherein the circuit decodes pilot symbols received at each of the plurality of antenna groups for each pilot pattern of the plurality of pilot patterns and then combines decoded pilot symbols for a same pilot pattern received at each of the plurality of antenna groups.

47. The wireless communication apparatus of claim 38, wherein the circuit is further configured to select the contiguous pilot pattern from a plurality of contiguous pilot patterns symmetric with respect to a center of the hop region.

* * * * *